(12) United States Patent
Weidemann et al.

(10) Patent No.: US 7,950,891 B2
(45) Date of Patent: May 31, 2011

(54) METHOD FOR THE LOADING AND UNLOADING RAILWAY WAGONS AND DEVICE, WAGON CHASSIS AND WAGON ATTACHMENT FOR CARRYING OUT SAID METHOD

(76) Inventors: Hans-Juergen Weidemann, Speyer (DE); Michael Baier, Mannheim (DE); Alexander Faller, Ergoldsbach (DE); Fritz Merk, Ergoldsbach (DE)

( * ) Notice: Subject to any disclaimer, the term of this patent is extended or adjusted under 35 U.S.C. 154(b) by 985 days.

(21) Appl. No.: 10/519,871

(22) PCT Filed: Jul. 4, 2003

(86) PCT No.: PCT/EP03/07196
§ 371 (c)(1),
(2), (4) Date: Oct. 31, 2005

(87) PCT Pub. No.: WO2004/005103
PCT Pub. Date: Jan. 15, 2004

(65) Prior Publication Data
US 2006/0099056 A1    May 11, 2006

(30) Foreign Application Priority Data
Jul. 4, 2002   (DE) .................................. 102 30 110

(51) Int. Cl.
*B65G 67/02* (2006.01)
(52) U.S. Cl. .......................... 414/344; 414/392; 414/809
(58) Field of Classification Search ................... 414/333, 414/339, 344, 349, 351, 352, 353, 392, 396, 414/809
See application file for complete search history.

(56) References Cited

U.S. PATENT DOCUMENTS

| | | | | |
|---|---|---|---|---|
| 3,260,223 A * | 7/1966 | Black et al. | ...................... | 410/52 |
| 4,049,135 A * | 9/1977 | Glassmeyer | ................... | 414/351 |
| 4,093,084 A * | 6/1978 | Ringer | .......................... | 414/343 |
| 4,522,546 A * | 6/1985 | Ringer | .......................... | 414/343 |
| 4,715,766 A * | 12/1987 | Gebhardt | ....................... | 414/392 |
| 5,421,687 A * | 6/1995 | Wayman | ....................... | 414/339 |
| 6,279,483 B1 * | 8/2001 | Murray et al. | .................. | 104/29 |
| 6,443,683 B2 * | 9/2002 | Randak | .......................... | 414/343 |
| 2005/0158158 A1 * | 7/2005 | Porta | ............................. | 414/392 |

FOREIGN PATENT DOCUMENTS

JP   59-194938 A  * 11/1984 ................... 414/333

* cited by examiner

*Primary Examiner* — James Keenan
(74) *Attorney, Agent, or Firm* — Lackenbach Siegel LLP; Myron Greenspan

(57) ABSTRACT

A method for loading and unloading rail cars includes at least one car, having a frame and a superstructure, moved into loading and unloading positions. During unloading the car superstructure is lifted off from the frame with lifting devices to an unloading level, and after the lifting operation the superstructure is moved at the unloading level in a transverse direction with respect to a longitudinal plane of the car until the superstructure is seated completely on a loading and unloading face. During loading the superstructure is moved from the loading and unloading face in a transverse direction with respect to the longitudinal plane of the car to above the frame and the superstructure is lowered, by lifting devices, onto the frame located in the loading and unloading positions. The lifting and lowering of the superstructures is carried out by lifting devices that are anchored to the track bed or secured to a platform. Also described are a method for transferring cargo from a first train to a second train, a loading and/or unloading device, a car frame and a car superstructure.

31 Claims, 30 Drawing Sheets

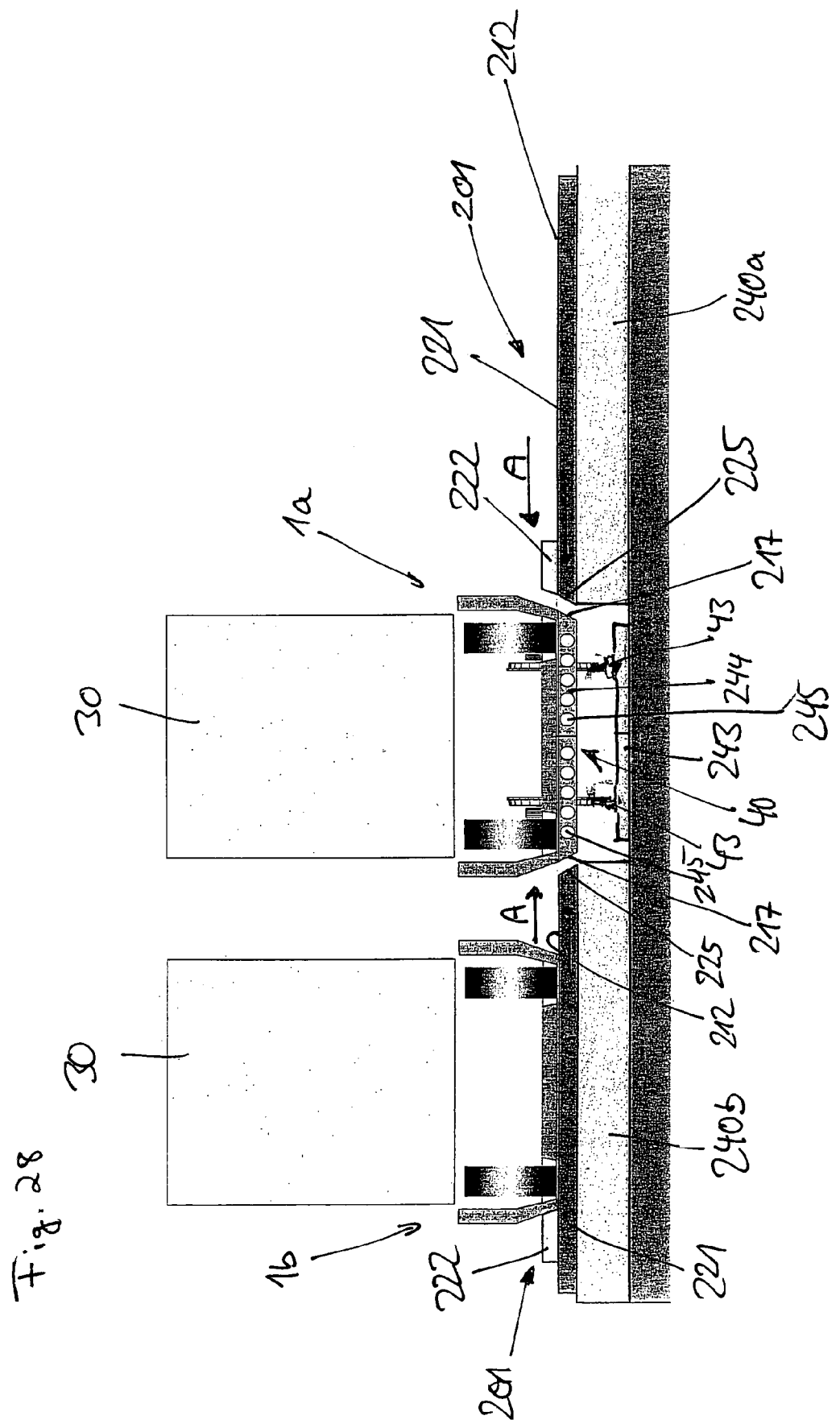

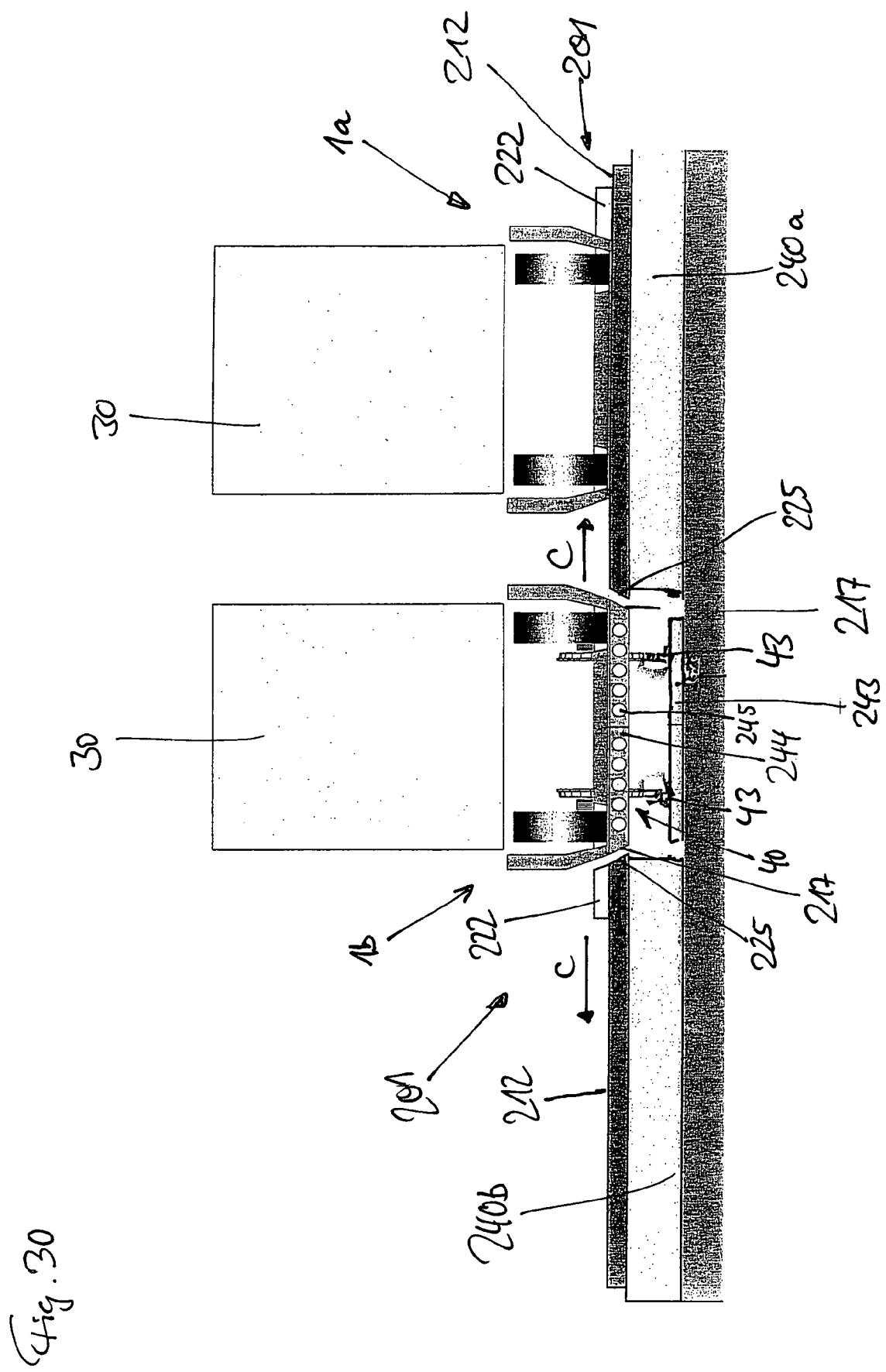

METHOD FOR THE LOADING AND UNLOADING RAILWAY WAGONS AND DEVICE, WAGON CHASSIS AND WAGON ATTACHMENT FOR CARRYING OUT SAID METHOD

The invention relates to a method for loading and unloading rail cars, a method for transferring cargo from a first train to a second train, a loading and/or unloading device, a car frame and a car superstructure and a car.

Such methods and such loading and/or unloading devices, car frames and car superstructures are known from DE 100 03 315 A1.

In a method for loading and unloading rail cars according to DE 100 03 315 A1 it is proposed to load and secure the goods on carriages irrespective of the presence of a train on the loading track or at any other desired locations, the carriages being moved into a loading position at the platform. Furthermore, the loading and unloading of the carriages is then carried out simultaneously or successively or in a cycled fashion for all the rail cars of a platform and the carriages are positioned in a self-centering fashion and secured on the rail cars by lowering. During the unloading operation, this process is reversed, the lifting or lowering of the carriages being carried out by lifting units which are secured to the car. The process requires a relatively large number of lifting units which are arranged on the car. The unladen weight of such a car is thus high, which reduces the permissible maximum cargo. In addition, as well as pneumatic brake devices, the car must also have active hydraulic systems or pneumatic systems so that the lifting units can be activated.

DE 100 03 315 A1 discloses a car frame which has car frames which are designed as a ladder frame with two longitudinal members which extend in parallel and transverse members which connect together two passive bogies for attaching the lifting units to the car frame. This frame design is costly.

Furthermore, DE 100 03 315 A1 discloses a car superstructure which has a trough-shaped spatial form with a continuous trough bottom and trough sidewalls which project upward in the manner of side members. The flat side of the trough bottom which points to the interior of the trough serves as a rolling surface for a semitrailer. The outwardly pointing flat side of the trough bottom is fitted, in its longitudinal edge region, with supporting rollers with which the carriages can be displaced by rolling in a transverse direction with respect to the longitudinal axis.

The object of the invention is to develop a method of the generic type in such a way that the expenditure on equipment is minimized and as a result the costs for production, operation and maintenance are reduced. Furthermore, a method according to the invention is intended to permit a wide variety of types of cargos to be loaded and unloaded.

The object of the invention is also to specify a method for transferring cargo from a first train section to a second train section, in particular of various trains.

Furthermore, an object of the invention is to specify a loading and/or unloading device and a car frame and a car superstructure which are suitable for the method according to the invention and permit an increased degree of flexibility with respect to the cargo containers or load goods to be loaded.

The invention will be explained in more detail below by way of example with reference to the drawings, in which:

FIGS. 28 to 30 are schematic diagrams of the chronological sequence of the unloading and loading process according to the method in accordance with the invention with the loading and/or unloading device according to the invention as in FIG.

Figure 26:
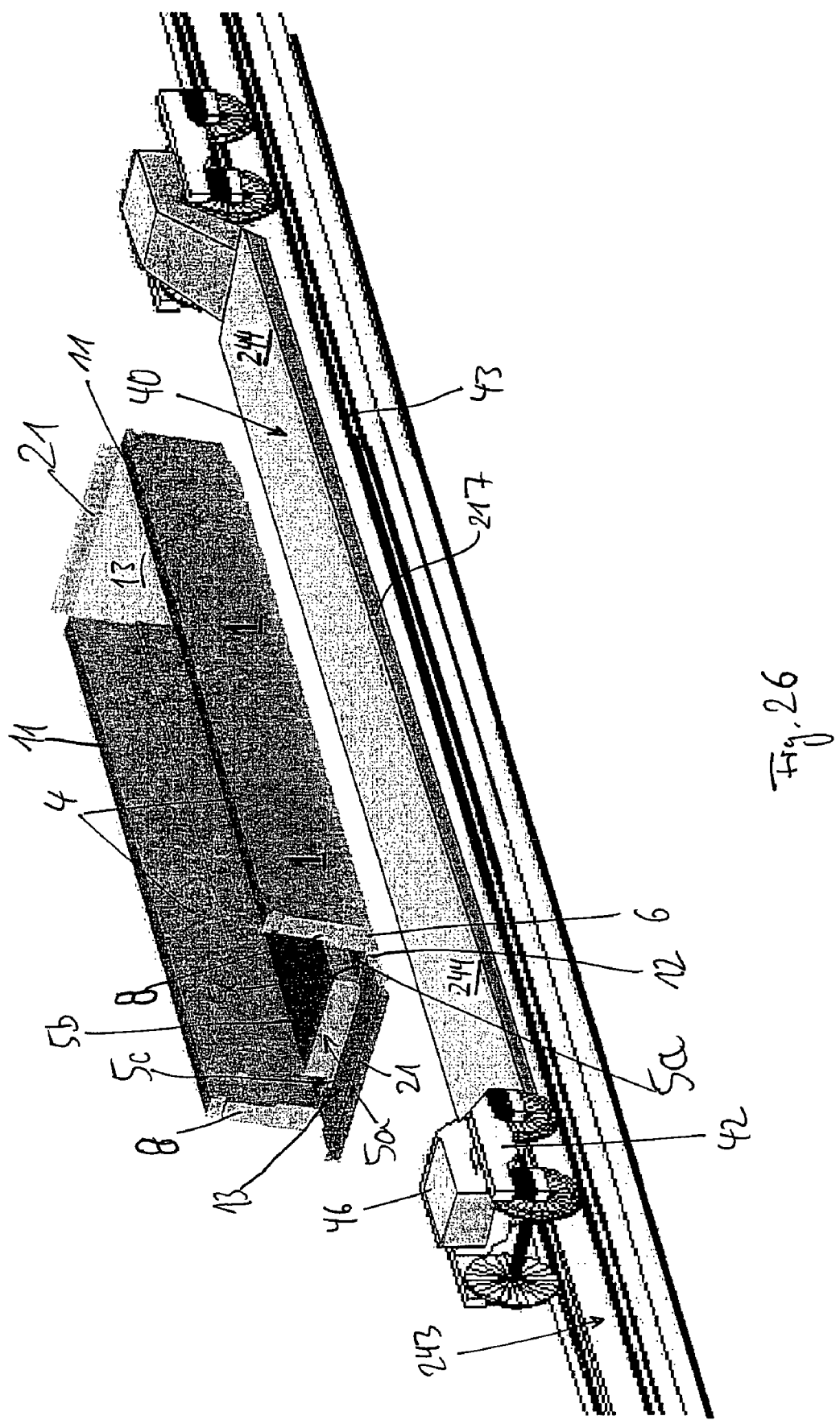
FIG. 26 is a perspective view of a further exemplary embodiment of a car frame according to the invention with a car superstructure according to the invention, the latter being illustrated floating unsupported above the car frame in a manner of an exploded view.

27 as well as the car frame according to the invention and the car superstructure according to the invention as in FIG. 26.

Figure 1:
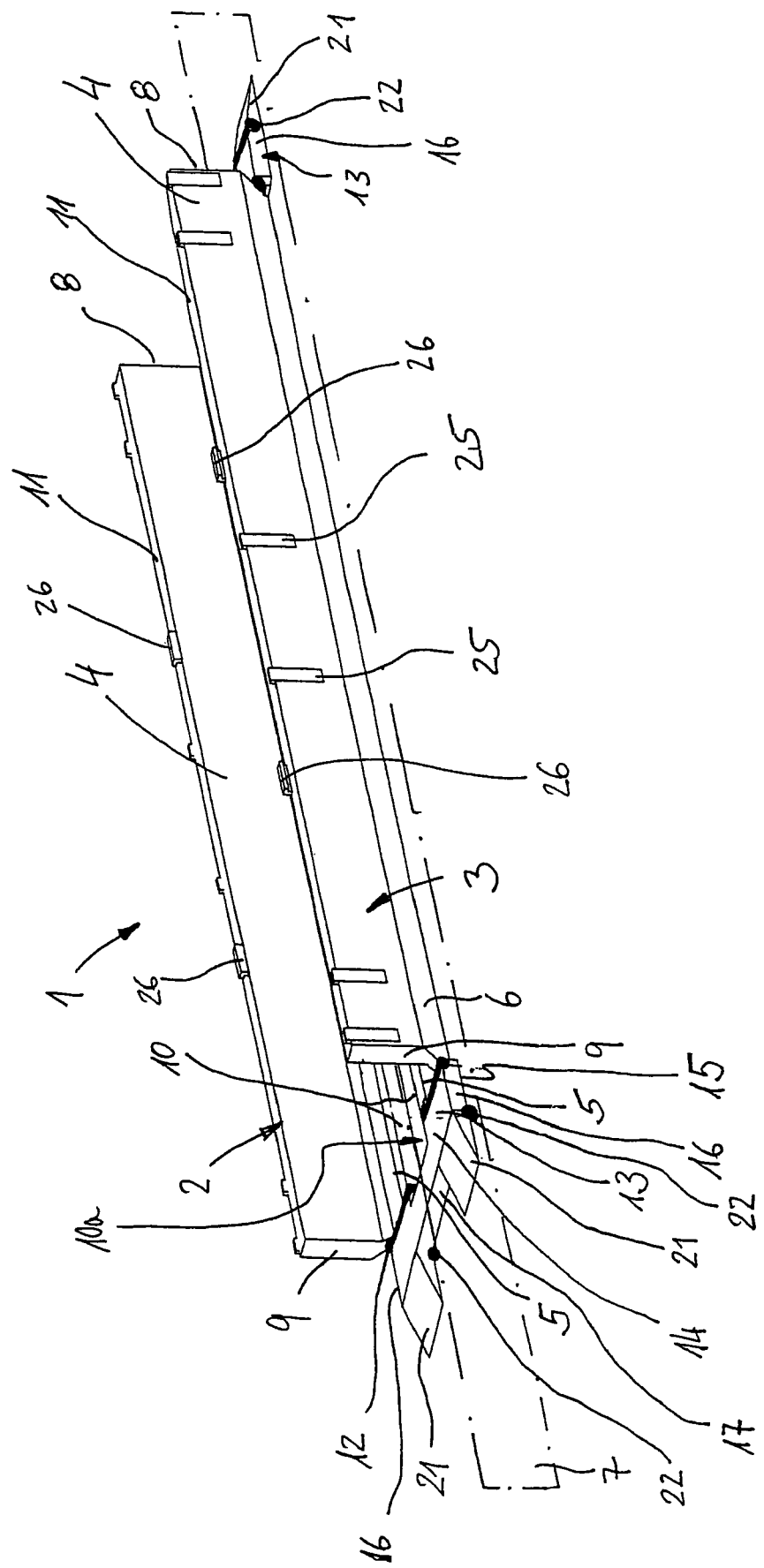
FIG. 1 is a perspective view of an exemplary embodiment of a car superstructure according to the invention in the unloaded state.
Figure 2:
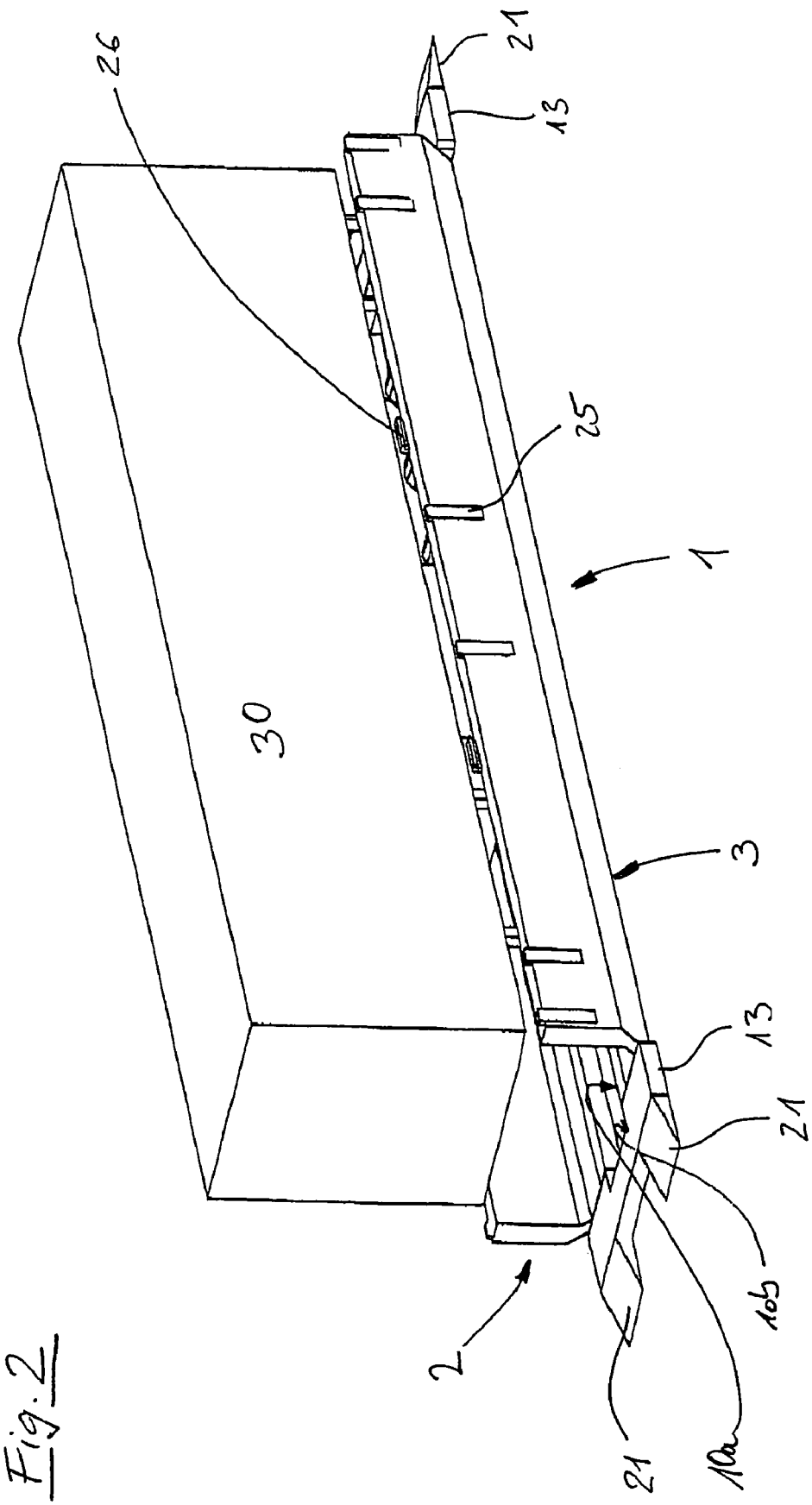
FIG. 2 shows the car superstructure according to FIG. 1 laden with a truck semitrailer.
Figure 3:
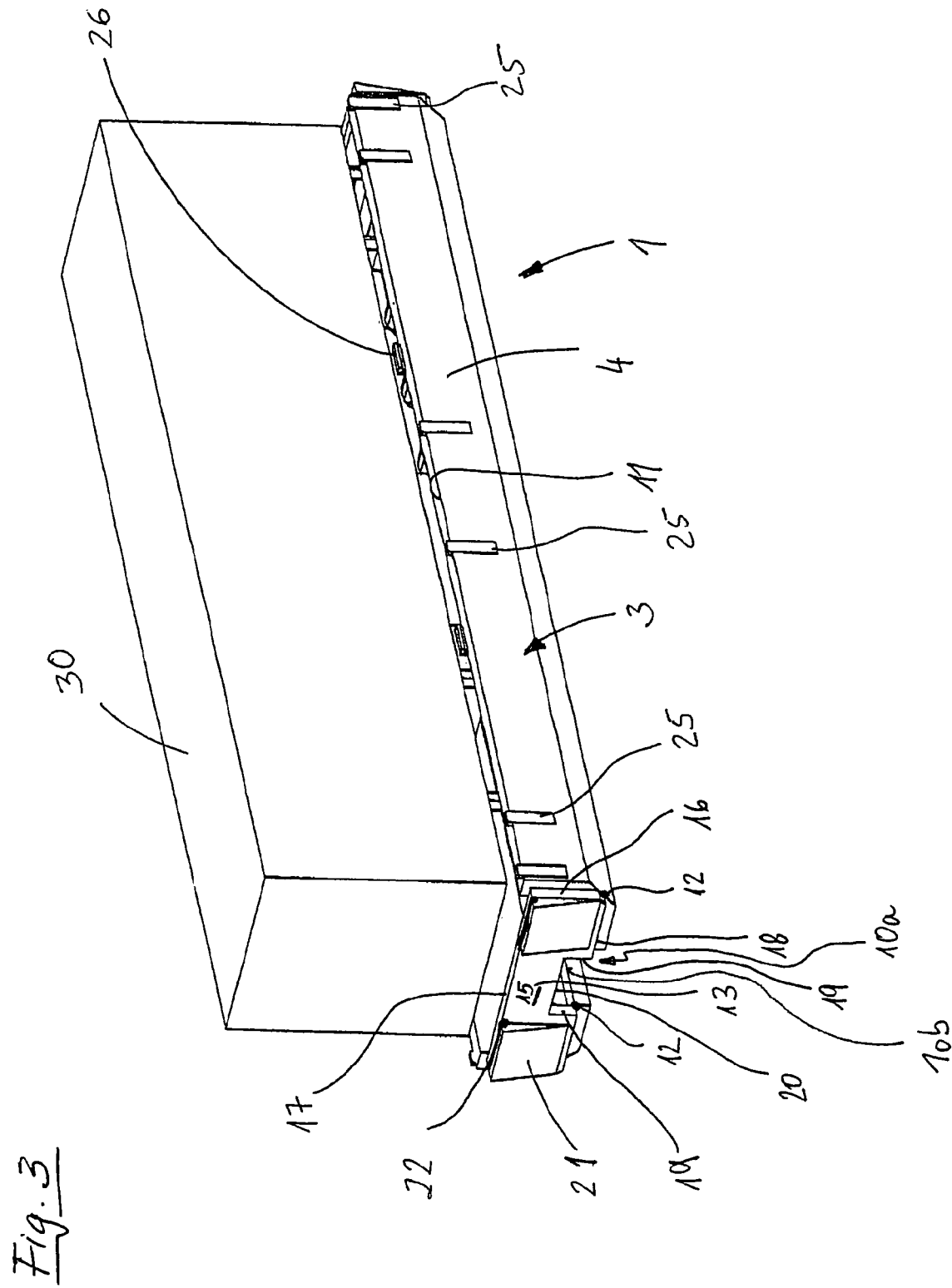
FIG. 3 shows the car superstructure according to FIG. 2 when it has been prepared for loading onto a car frame according to the invention.

A car superstructure 1 according to the invention (FIGS. 1, 2, 3) has an essentially trough-shaped spatial form, with the trough-shaped spatial form being formed, for example, from a first lateral trough element 2 and a second lateral trough element 3. In another embodiment, the car superstructure 1 has a trough shape with an essentially enclosed cross section (FIG. 26). The car superstructure 1 is not divided into two longitudinal halves here.

The trough elements 2, 3 extend in the longitudinal direction of the car superstructure 1 in parallel and spaced apart one next to the other and have an approximately L-shaped cross section with a first vertical trough wall element limb 4 and a second horizontal trough bottom element limb 5. The trough element limbs 4, 5 are connected at the corner, regions by means of a narrow sloping wall 6. The sloping wall 6 advantageously permits a truck trailer, a semitrailer, an interchangeable bridge of a truck, a container or the like to be centered.

The second trough element limb 5 forms in each case part of the bottom, and the trough element limb 4 forms in each case a lateral boundary wall of the car superstructure 1. Each trough element 2, 3 has a L-shaped, first end-side free front end edge 8 and a L-shaped second end-side free front edge 9. Furthermore, each trough element limb 5 has a free longitudinal edge 10 pointing to a vertical longitudinal center plane 7, and each trough element limb 4 has an upper free longitudinal edge 11.

The trough elements 2, 3 each form a main part of the car superstructure 1 and are arranged in such a way that the free longitudinal edges 10 lie opposite one another in parallel and spaced apart so that a gap or a slit 10a is formed. The second trough element limbs 5 are arranged on a horizontal plane and the free front end edges 8, 9 of the trough elements 2, 3 are aligned with one another in a vertical plane which is transverse with respect to the plane 7. A closing flap 13 which can pivot about a horizontal axle 12 is arranged at the edges 8, 9 of the second trough element limbs 5, in each case at the ends, which closing flap 13 can pivot from a horizontal position, in which it is aligned with the trough element limbs 5, into a vertical position in which the flap 13 bears against the free end edges 8, 9 of the first trough element limbs 4. In the closed, folded-up position (FIG. 3), the flap 13 ends flush or preferably somewhat below the level of the upper longitudinal edges 11. The closing flap 13 has a first flat side 14 on the car side and a flat side 15 on the outside as well as two lateral narrow side boundary edges 16 and an end edge 17 and a coupling edge 18. In the region of the edge 18, the flap 13 is connected to the trough elements 2, 3 so as to be pivotable in an articulated fashion about, in each case, an axle 12, over a length which corresponds to the width of the limbs 5. In each case two trough elements 2, 3, whose horizontal trough element limbs 5 lie opposite one another in a spaced apart arrangement, form a main part of the car superstructure 1 in a symmetrical fashion with respect to the longitudinal center plane 7. The outer contour of the car superstructure 1 preferably remains within the profile limits which apply for rail traffic.

Figure 4:
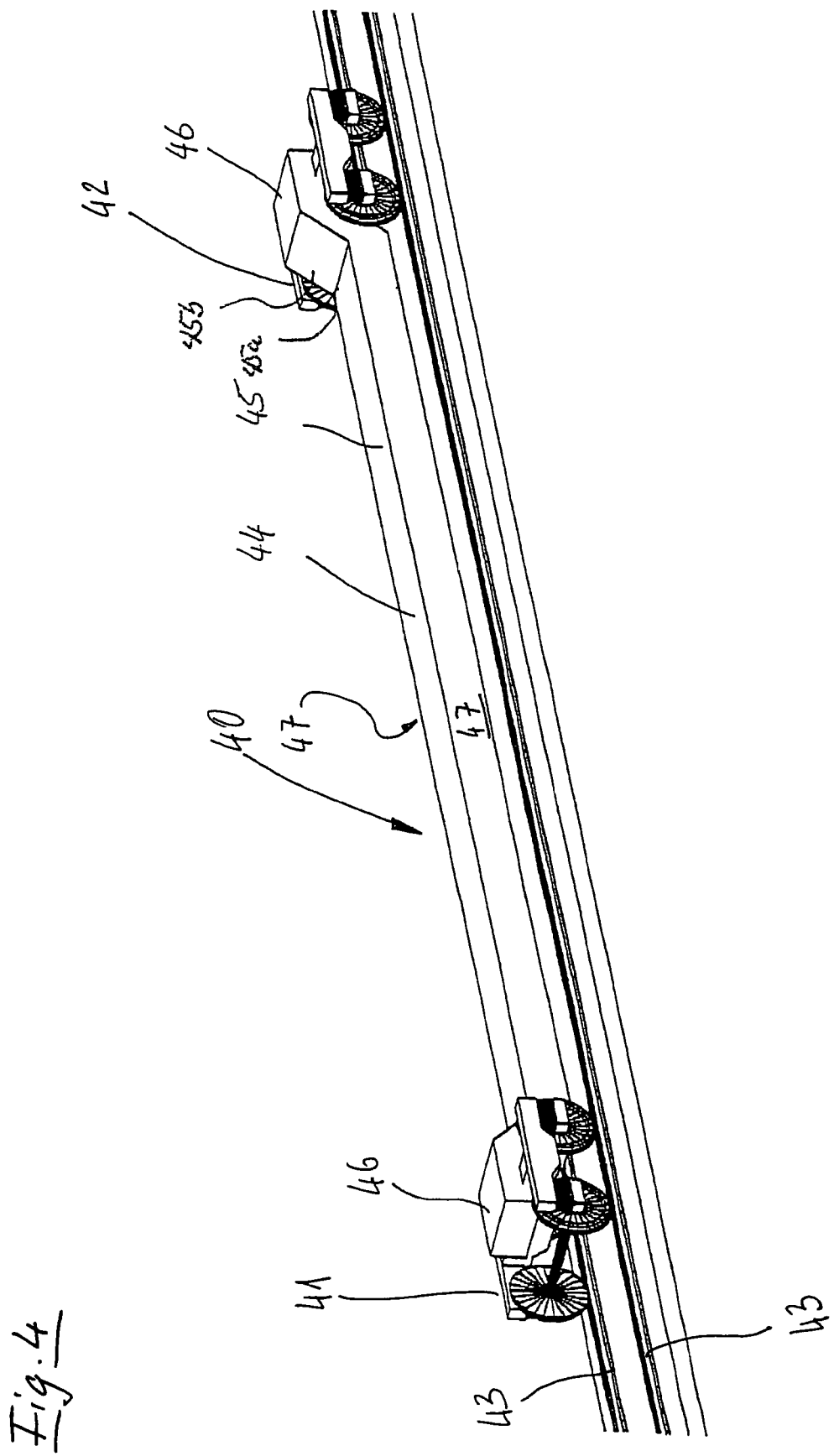
FIG. 4 shows as perspective view of an exemplary embodiment of a car frame according to the invention.

In the region of the gap 10a, the flap 13 has a U-shaped recess 10b which starts from the edge 18 and has, two U-limb edges 19 and a U-base edge 20. The U-shaped recess 10b is dimensioned in such a way that it is the width of the gap 10a, and in the vertically folded-up position of the flap 13 it forms a vertical stop for a center longitudinal member 44 of a car frame 40, as is described further below (FIG. 4).

In the folded-up state, the flap 13 can be locked to the trough elements 2, 3 by means of suitable locking elements (not shown). At the end edge 17 of the flap 13, two wedge-shaped run-up ramp elements 21 are arranged on the sides of the flap 13 so as to be pivotable about an axle 22 in each case. In the folded-out position of the flap 13, the underside of the run-up ramp elements 21 is aligned with the flat side 15. The run-up ramp elements 21 have a wedge shape so that vehicles, for example a truck or a truck semitrailer can drive into the car superstructure 1.

In the folded-up state of the flap 13, in each case the underside of the run-up ramp elements 21 is folded against the flat side 15 of the flaps 13 and locked there. In one embodiment, the flap 13 is configured to serve as a means of locking the truck or the truck semitrailer. One or both closing flaps 13 form, together with a mechanism which can also be folded up, an articulated frame here, the upper side having receptacles which are suitable for locking the semitrailer 30, for example at what are referred to as kingpins. The articulated frame can particularly preferably be locked to the trough limbs 4 in a positively locking and/or frictionally locking fashion. The locking brings about lateral stabilization of the trough limbs 4.

Figure 5:
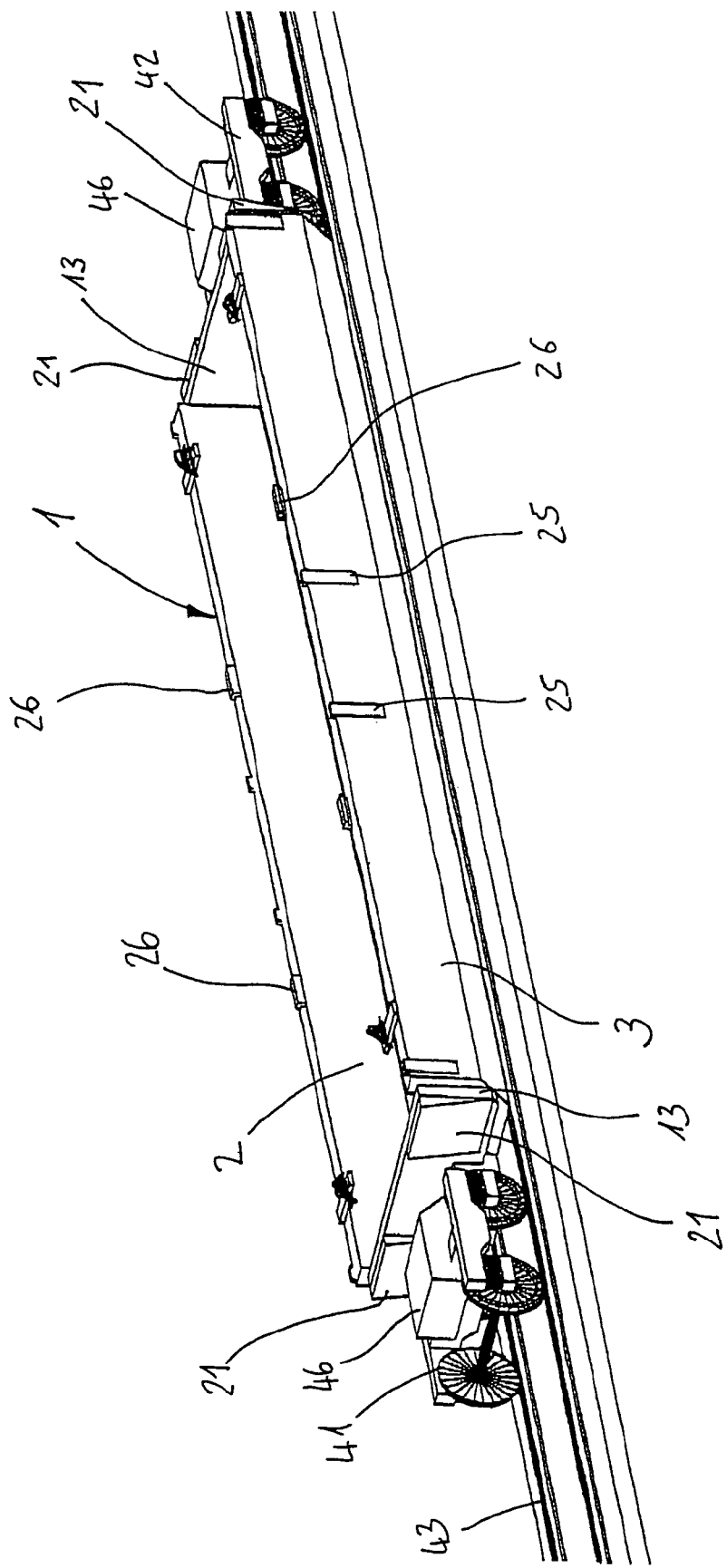
FIG. 5 shows a perspective view of an exemplary embodiment of the car frame according to the invention, provided with a further exemplary embodiment of the car superstructure according to the invention.
Figure 6:
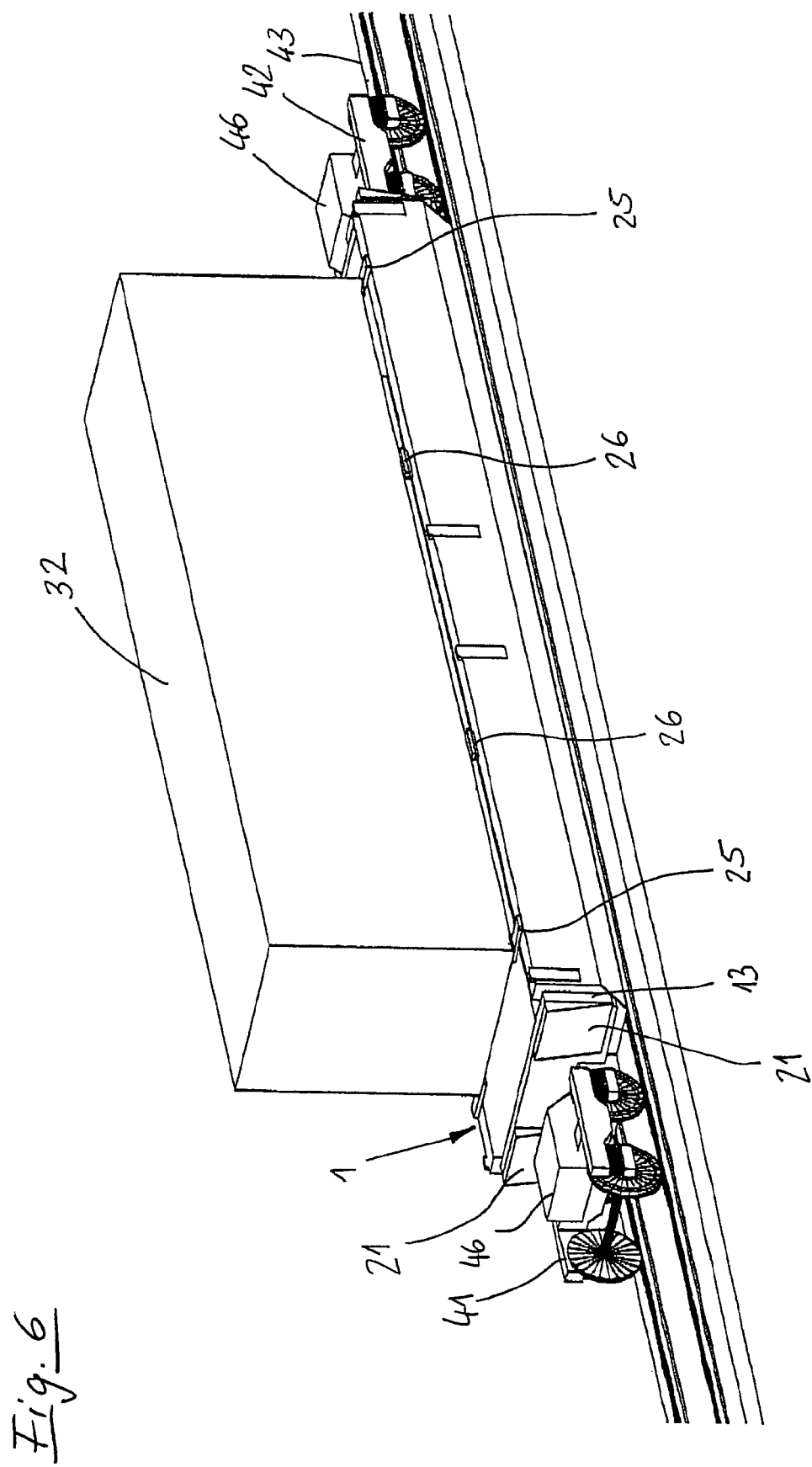
FIG. 6 shows the car according to FIG. 5 laden with a 40-foot container.
Figure 7:
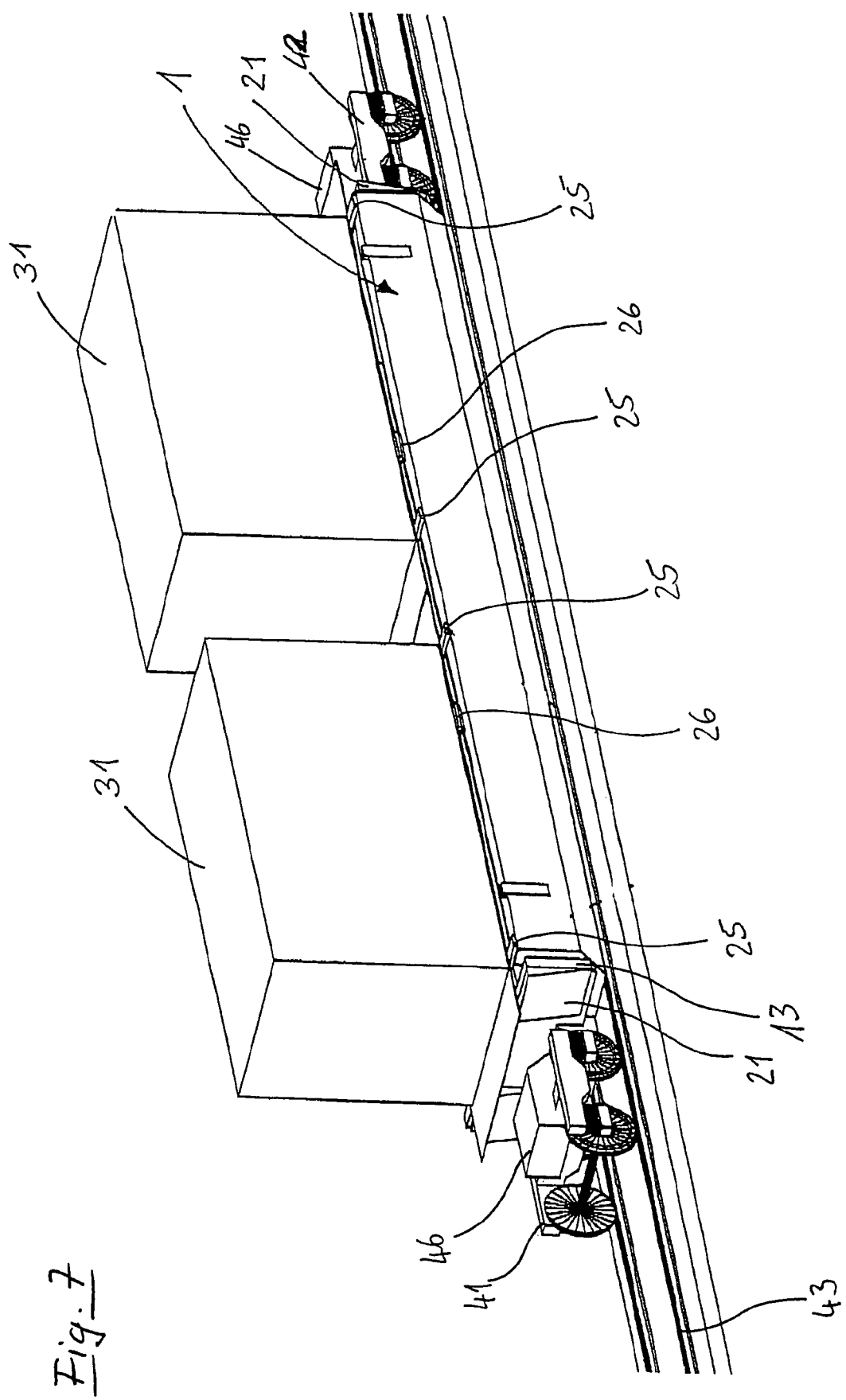
FIG. 7 shows the car according to FIG. 5 laden with two 20-foot containers.
Figure 8:
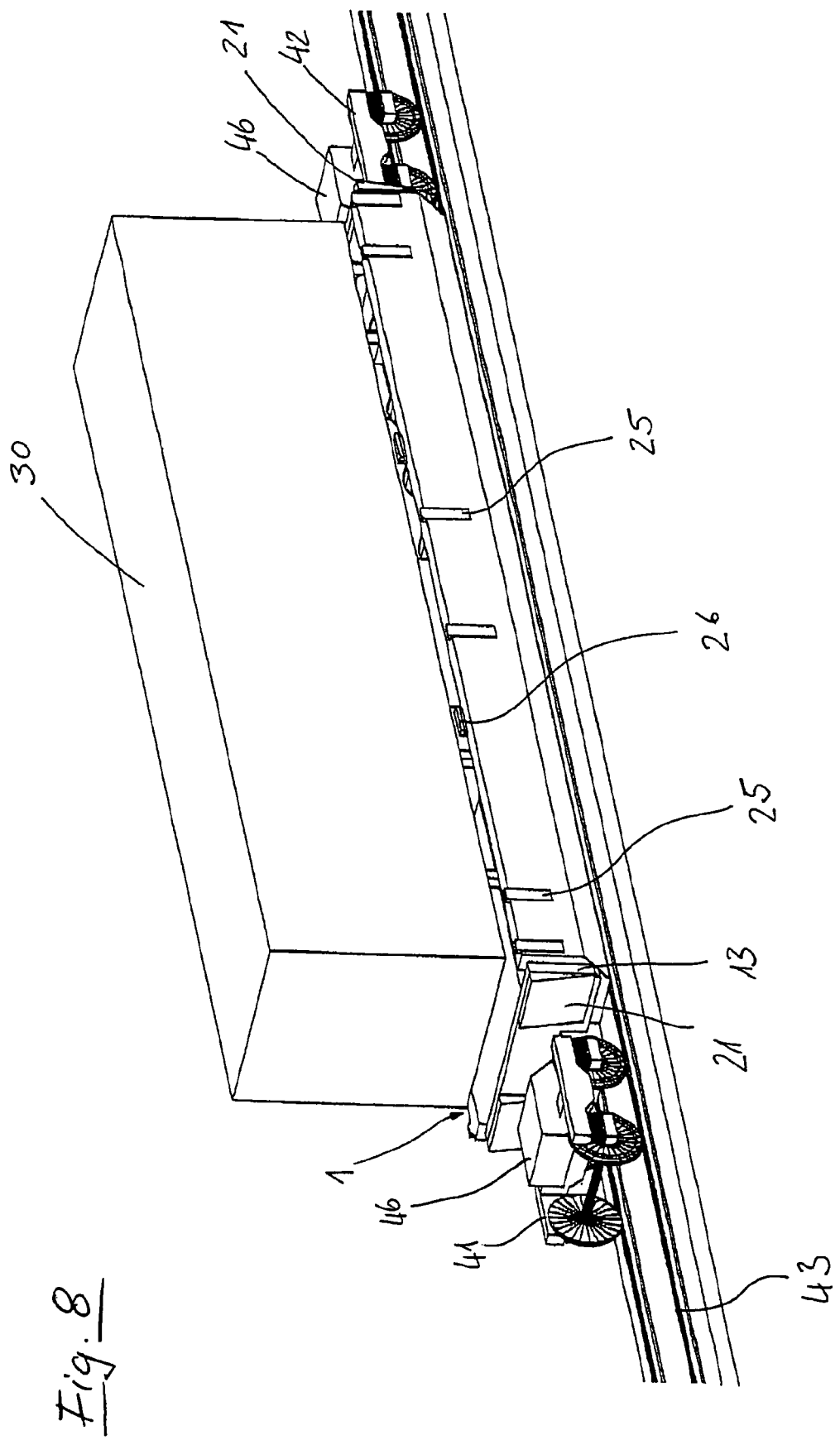
FIG. 8 shows the car according to FIG. 5 laden with a truck semitrailer.

The cohesion of the car superstructure 1 and of the trough elements 2, 3 is ensured by means of the flap 13 and the axle 12. Supporting means 25 (load receptacles) which can be folded out are arranged along the longitudinal outer side of the car superstructure 1, in particular of the trough element limbs 4. The supporting means 25 are arranged on both sides along the longitudinal extent of the car superstructure 1 in such a way that both commercially available 20-foot containers 31 and 40-foot containers 32 can be placed on the folded-out supporting means 25 (cf. for example FIGS. 5, 6, 7). In a position of rest, the supporting means 25 are arranged countersunk in the first trough element limbs 4 of the trough elements 2, 3, and when necessary they can be folded inward toward the longitudinal center plane 7 by pulling up so that supporting faces for the containers 31, 32 are produced. In the position of rest of the supporting means 25, they do not disrupt the clearance between the trough elements 2, 3 so that semitrailers or other rollable goods containers can be moved in without impedance.

Figure 27:
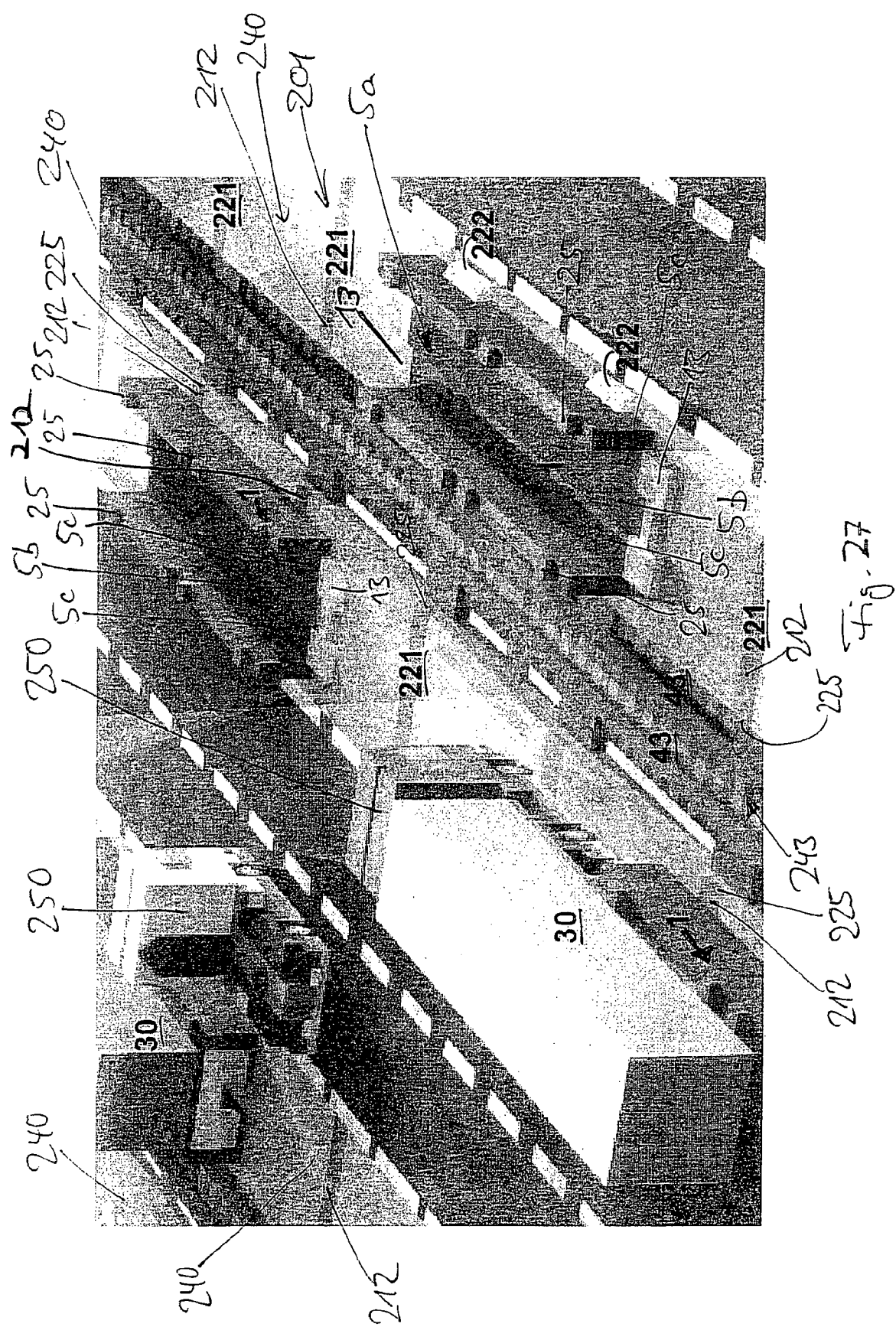
FIG. 27 shows a loading train station with a loading and/or unloading device according to the invention for carrying out a transfer method according to the invention using car frames and car superstructures as in FIG. 26.
Figure 23:
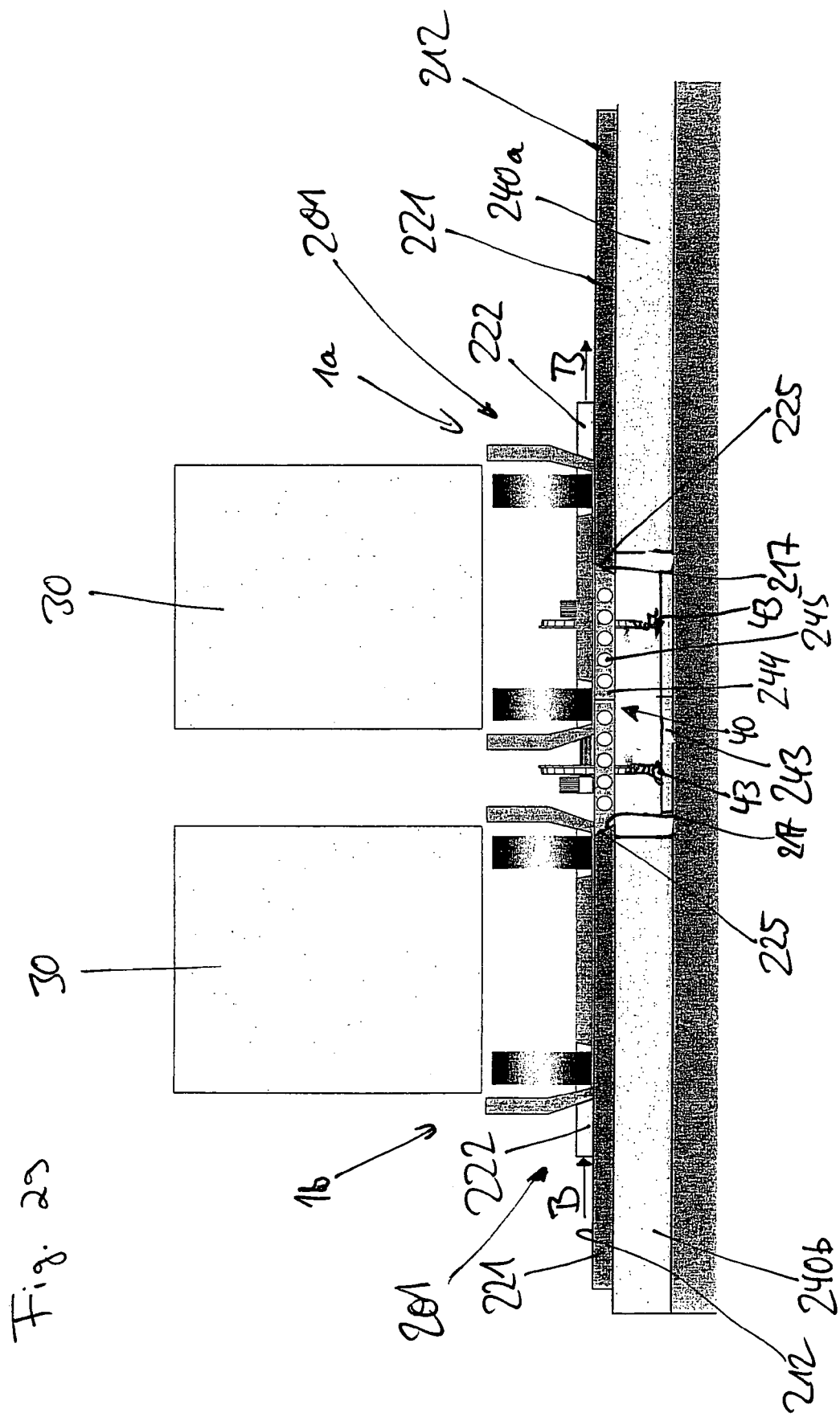

In one embodiment of the car superstructure 1 (FIG. 27), the supporting means 25 are embodied as load receptacles such that containers, in particular standardized corner fittings which are customary in the transport industry or crane gripping edges of containers and/or interchangeable bridges can be secured to the load receptacles 25 in a frictionally locking and/or positively locking fashion. The load receptacles 25 are configured for this purpose in such a way that the containers/interchangeable bridges can be secured to the load receptacles 25 in a transport position in which the containers/interchangeable bridges rest on truck flat bed bodies and/or trailers. This embodiment is, particularly suitable for use in a truck interchangeable bridge. The truck interchangeable bridge transporter with one or two interchangeable bridges can transfer the interchangeable bridges 30 to the car superstructure 1 and pick them up again without the supporting legs of the interchangeable bridges 30 having to be folded out for this purpose. In addition, a container can be transferred from a truck 250 to the car superstructure 1 without the aid of a crane or other transportation means and picked up again. The load receptacles 25 are preferably embodied and mounted in such a way that they ensure free passage of semitrailers or interchangeable bridge trucks 250 if the load receptacles 25 are not being used and are moved into a position of rest. The load receptacles 25 are particularly preferably configured here in such a way that, in order to secure the interchangeable bridges 30 and containers, position tolerances of the trucks 250 in the range up to approximately 25 cm and vertical tolerances of a few centimeters, for example 5 to 10 cm, can be compensated. The movement of the load receptacles 25 can be brought about manually and/or by means of hydraulic/pneumatic and/or by means of electrical drives. The load receptacles 25 preferably have lifting cylinders. The lifting cylinders are configured for electrical operation or fluidic operation. The lifting cylinders lift interchangeable bridges 30 and/or containers from the truck loading areas. The load receptacles 25 are preferably configured in such a way that, after the trucks 250 have been driven out of the car superstructure 1, they assume a transportation position with additional mechanical locking, for example to the undersides of the corner fittings of the interchangeable bridges 30 and containers.

Furthermore, gripping edges 26, which are designed to correspond to gripping arms of loading cranes, for example what are referred to as piggyback cranes or the like, are arranged on the free longitudinal edges 11 of the trough element limbs 4 with suitable spacing.

By means of the gripping edges 26, the car superstructure 1 together with the loaded goods can, if necessary, be lifted and loaded in the manner of a container. The gripping edges 26 have a L-shaped spatial form in cross section and are arranged on the car superstructure 1 in such a way that a gripping undercut for the piggyback arms is formed.

With such a car superstructure 1 according to the invention, it is particularly advantageous that by folding out the flaps 13, arranged at both ends, and the run-up ramp elements 21 a car superstructure 1 through which it is possible to drive freely in the longitudinal direction is formed so that a truck, for example together with the semitrailer 30, can drive onto the car superstructure 1 at one end. If the truck semitrailer 30 has arrived, in the longitudinal direction, at the position which is suitable with respect to the car superstructure 1, the truck can be decoupled and can leave the car superstructure 1 again at the other end via the flap and the ramp elements 21.

In one embodiment, there are terminals for a power supply (fluidic, electrical or mechanical) and/or for data transmission (electrical, electronic, optical, magnetic or fluidic) on the outside of the car superstructure 1. These terminals are preferably provided for an automated connection process. The car superstructure 1 is configured to form a passive unit with the car frame 40 when the power terminals are decoupled, said passive unit being preferably frictionally and positively locked by mechanical means in a redundant fashion. In this embodiment, it is necessary to supply external power and/or external signals through corresponding terminals of the car frame 40 in order to eliminate the passivity, in particular in order to bring about unlocking.

In one embodiment, the car superstructure 1 is configured to generate, by means of externally supplied fluidic or electrical energy, a fluidic or magnetic layer which is located under the car superstructure 1 and supports the car superstructure 1 and cargo. A pneumatic or hydraulic fluid or some other fluid, for example an oil film which is placed at least on the surface of the walking beam 212 and/or a layer of compressed air which is generated under the bottom 5a of the car superstructure 1, is provided as the fluid.

In one particular embodiment, the car superstructure 1 can be moved in the manner of a magnetic levitation transportation system. The fluid permits the car superstructure 1 to be displaced transversely on any smooth surfaces, for example from the car 1, 40 to an unloading surface, or to be displaced laterally on the unloading surface to further locations or from the unloading surface to another car 1, 40. The expenditure of force which is required here is particularly small.

The car superstructure 1 is adapted to a car frame 40. In one preferred embodiment of the invention, the car frame 40 (FIGS. 4 to 8) is seated with two spaced-apart bogies 41 and 42 on tracks 43. The bogies 41, 42 are preferably embodied as double-axle bogies and correspond to the present standard of railroad companies. According to the invention, the bogies 41, 42 are connected to a single central longitudinal member 44.

The longitudinal member 44 has an rectangular shape, preferably tube-shaped hollow rectangular spatial form in cross section and has, if appropriate, suitable internal reinforcement plates or reinforcement webs (not shown). The longitudinal member 44, 244 is preferably given a particularly high level of flexural strength in the longitudinal direction by prestressing, which is generated for example by means of cables or belts which can be subjected to high loads or by other means. As a result a particularly small longitudinal member cross section is possible.

In the region between the bogies 41, 42, the longitudinal member 44 is arranged in such a way that its upper side 45 is arranged somewhat above the plane of the wheel set rotational axles. The longitudinal member 44 is embodied so as to be bent at a right angle at both ends and is seated with its ends 46 which are bent at a right angle on the respective bogie 41, 42. The central longitudinal member 44 has a width which corresponds to the width of the gap 10a so that a car superstructure 1 according to the invention with the gap 10a can be fitted over the longitudinal member 44.

In the process, the longitudinal member 44 penetrates the gap 10a until the U base edge 20 is seated on the upper side 45 so that the car superstructure 1 is secured with respect to the longitudinal member 44 in the vertical direction. The longitudinal edges 10 and the U limb edges 19 can be supported on side faces 47 of the longitudinal member 44 in the lateral direction so that lateral guidance of the car superstructure on the car frame is ensured.

In one embodiment, the rectangular or trapezoidal cross section of the longitudinal member 244 has a particularly low height (FIG. 26). The longitudinal member 244 is, for example, penetrated in the longitudinal direction by ducts 245 so that the weight of the longitudinal member 244 is particularly low for a given degree of rigidity. As a result, the car frame 40 is lightweight. In one embodiment, the car frame 40 is constructed in such a lightweight fashion that the rigidity of the car frame 40 is per se, for example to ensure the maximum loads provided for the car 1, 40, not sufficient to receive the load of the car superstructure 1, in particular of the car superstructure 1 which is loaded with a cargo 30.

The car superstructure 1 of the embodiment with the enclosed trough shape has, for example, a bottom 5a made of sheet steel. The sheet steel is, for example, three centimeters thick at maximum. The sheet steel is preferably made thinner, for example the thickness is one to two centimeters. In one embodiment, a bottom structure 5b is formed on the sheet steel. The bottom structure 5b expediently reinforces the car superstructure 1. On both sides of the bottom structure 5b, the bottom 5a has switch openings 5c. The car superstructure 1 can preferably be seated flat, in particular with the underside of the bottom 5a, on the longitudinal member 244. The side walls 4 of the trough-shaped car superstructure 1 are embodied so as to be hollow, for example as a hollow sectional body, for example from a comparatively thin steel sheet, and give the car superstructure 1 a particularly high level of rigidity. The car superstructure 1 is embodied so as to be capable of being locked to the car frame 40. If the car superstructure 1 is lowered onto the car frame 40, in particular onto the particularly lightweight frame 40, in particular with the longitudinal member 244 which has a low height, and is locked to the car frame 40, the car 1, 40, i.e. the locked combination of the car superstructure 1 and car frame 40, overall has a sufficient level of rigidity, in particular flexural strength and/or compressive strength and/or torsional strength in order, in particular, to reliably absorb static and/or dynamic loads occurring during operation so that, for example, the maximum loads which are provided for the car 1, 40 are ensured in this way.

The car superstructure 1 is secured in the longitudinal direction with respect to the car frame 40 by means, for example, of the lower edge 45a which is bent at a right angle, with the advantage that the right-angled bend is made in each case by means of a slope 45b, the slopes 45b permitting the car superstructure 1 to be centered by slipping when it is placed in position. The car superstructure 1 can thus be secured in a self-locking fashion. In addition, further suitable receptacle mandrels or similar attachment means can be provided. In a further preferred embodiment of the car frame 40, securing means are arranged at a plurality of locations on the longitudinal member 244. Arranging the securing means at a plurality of locations is particularly advantageous because the longitudinal member 244 is prevented from sagging with respect to the car superstructure 1 as a result of absorbing forces in all spatial directions.

In one embodiment of the car frame 40, wedge-shaped and/or rectangular centering faces are formed in the longitudinal member. The centering faces are preferably configured in such a way as to cause the car frames 40 to be centered and secured in all spatial directions by interacting with ramp faces of walking beams and during a feed movement of the walking beams.

In addition to the standard bogies 41, 42, the car frame 40 includes further devices which are necessary for forming trains and for the locomotive mode, for example brakes, main air system, signal system, buffer, coupling devices, position lights etc. These are not illustrated here for the sake of simplicity.

In an alternative embodiment (not illustrated) of the car frame according to the invention, two longitudinal members are connected to one another by means of a single double-axle bogie, referred to as a Jakobs bogie, in such a way that in each case two cars are supported on this bogie. A shorter design of train is particularly advantageous here.

Figure 9:
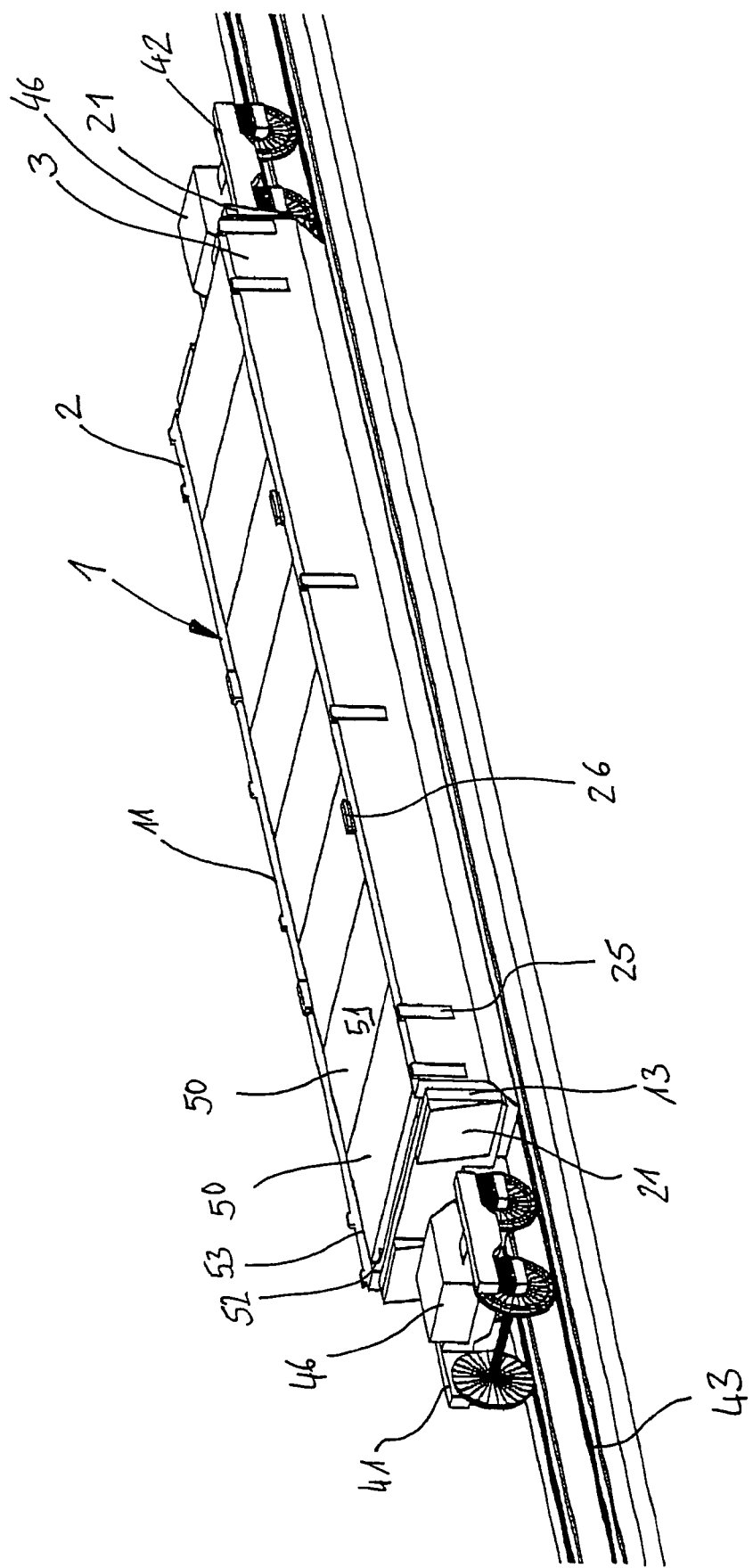
FIG. 9 shows the car according to FIG. 5 provided with boarded floor elements so that a flat car which is compatible with the customary flat car is formed.

A car 1, 40 according to the invention as in FIG. 9, composed of a car superstructure 1 according to the invention and a car frame 40 according to the invention, can easily be reconfigured into a flatcar. For this purpose, floorboards 50 can be inserted into the interior of the trough-shaped car superstructure 1, wherein the floorboards 50 have an upper side 51 which ends flush with the longitudinal edges 11. In order to form a flat floor, a large number of floorboards 50 are arranged in such a way that the trough of the trough-shaped car superstructure 1 is closed.

The floorboards 50 have an essentially rectangular-panel-shaped spatial form with longitudinal edges 52 and narrow side edges 53, with the floorboards 50 being arranged in such a way that the narrow side edges 53 bear against the first trough element limbs 4 so that joints between the floorboards 50 are oriented transversely with respect to the direction of travel.

Figure 10:
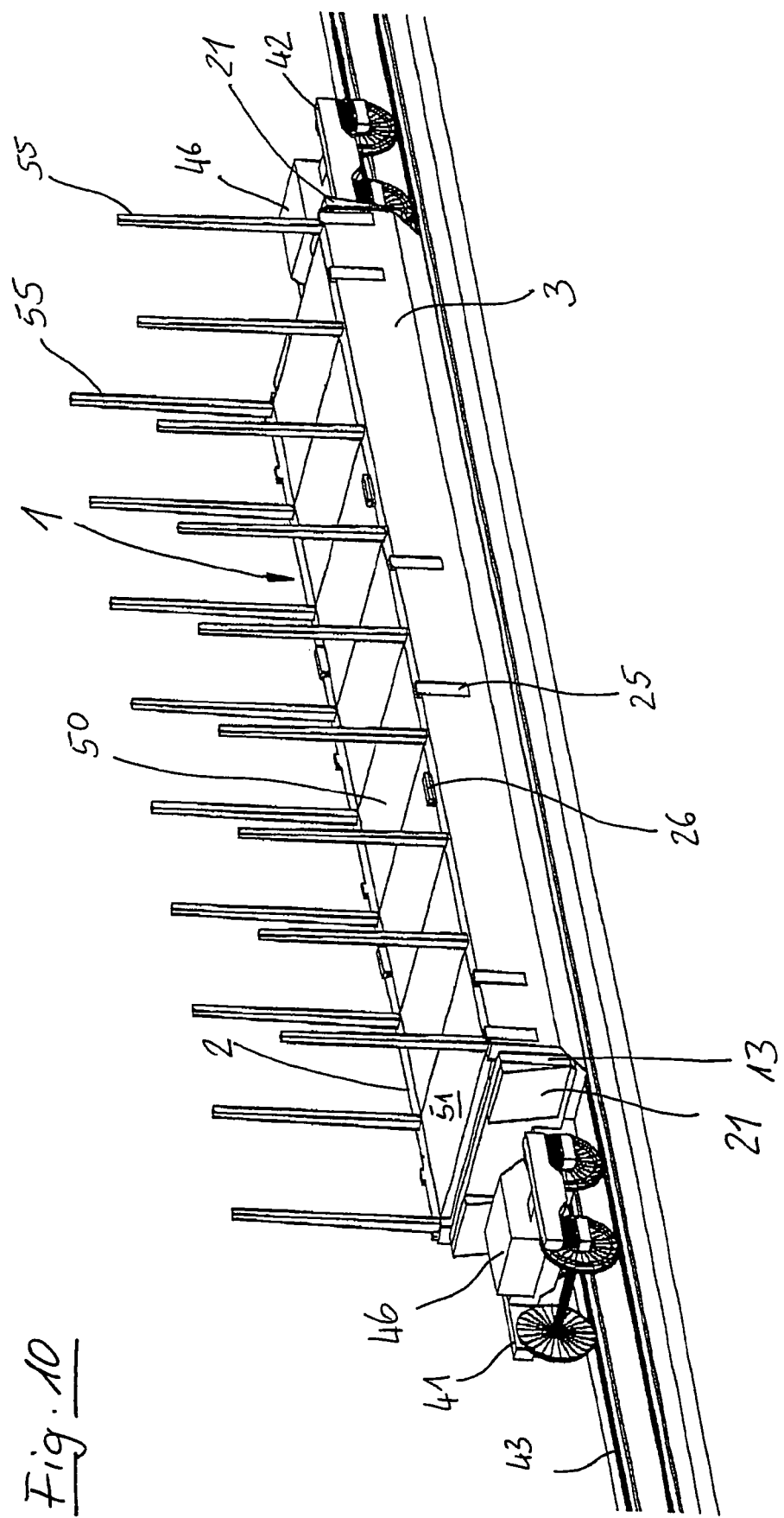
FIG. 10 shows the car according to FIG. 9 with stanchions arranged around the edges.
Figure 12:
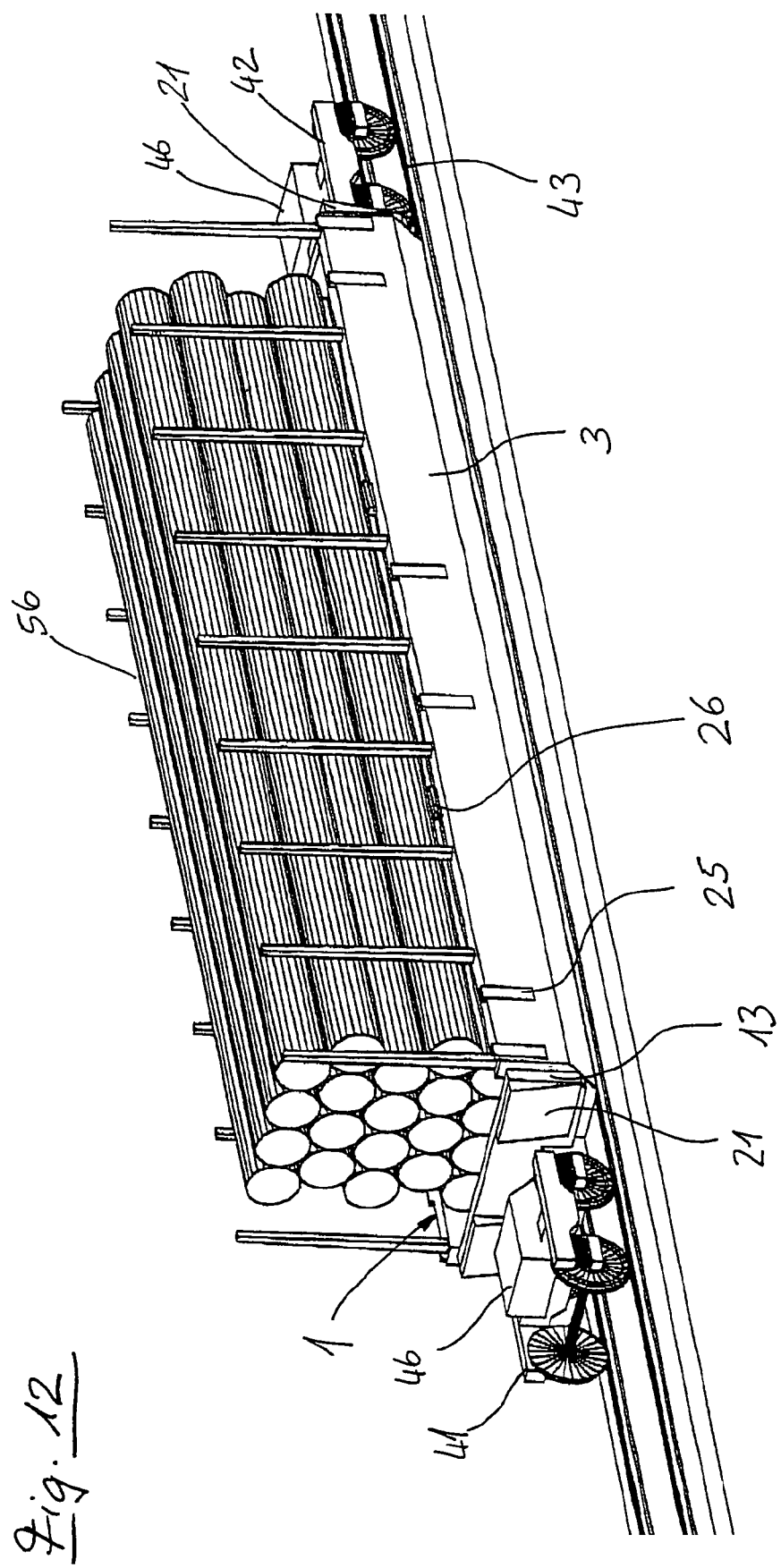
FIG. 12 shows the car according to FIG. 11 in a laden state with elongate round elements, for example tree trunks or pipes.

In a further embodiment of the car 1, 40 according to the invention (FIG. 10) composed of car superstructure 1 and car frame 40, vertically upwardly projecting stanchions 55 are inserted along the longitudinal edges 11 of the trough element limbs 4 so that a car with stanchions can easily be formed from a flat car. The stanchions are elongate, rod-shaped securing elements which permit elongated goods 56, for example tree trunks or pipes, to be transported using the car 1, 40 according to the invention (FIG. 12).

Figure 11:
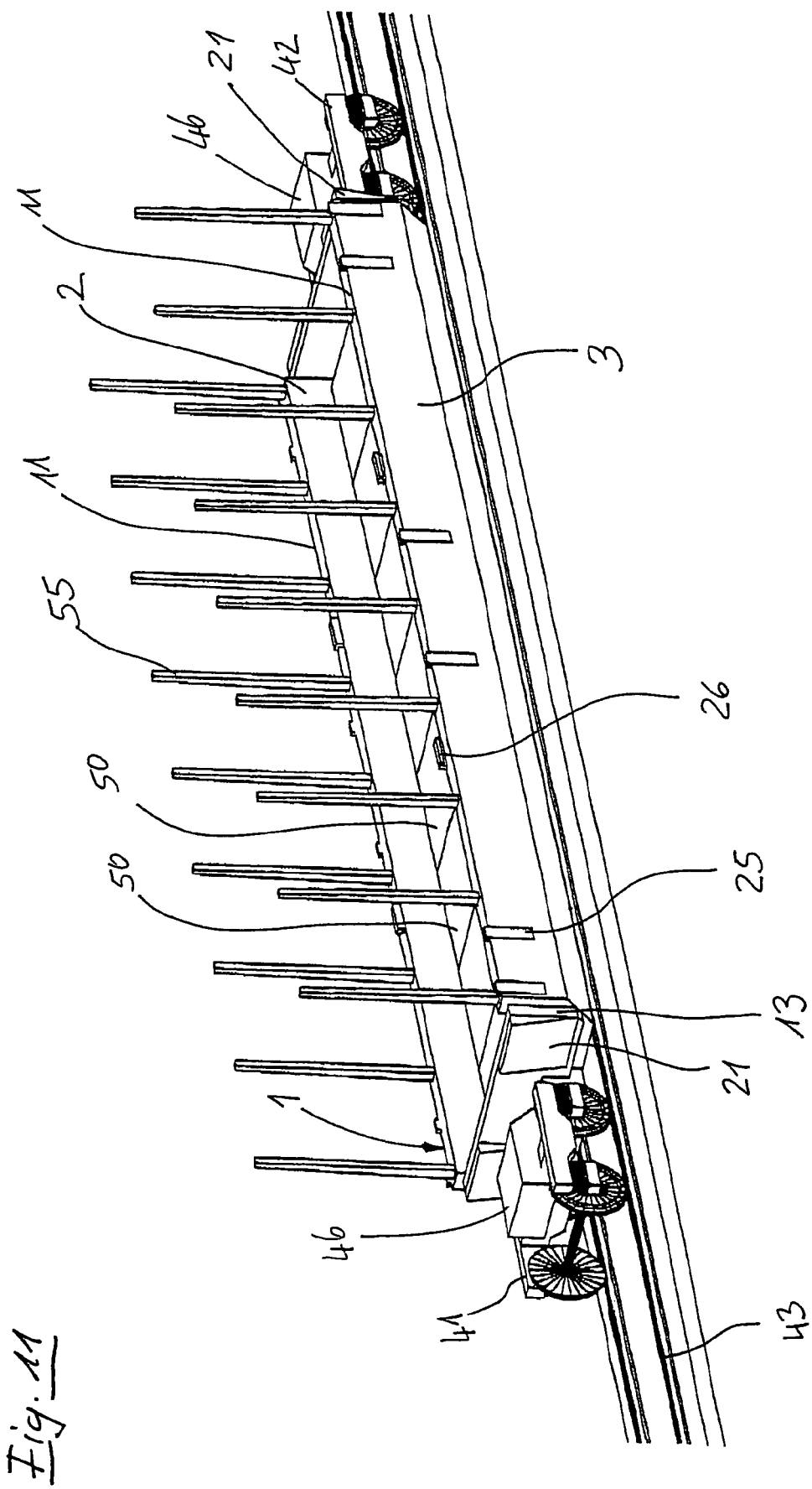
FIG. 11 shows the car according to FIG. 10 with a lowered boarded floor.

In a further embodiment according to the invention as in FIG. 11 of the car 1, 40 according to the invention, the floorboards 50 are lowered somewhat with respect to the level of the longitudinal edges 11 forming an intermediate floor so that a trough-shaped space is produced which has an enclosed floor and four side walls. The floor is formed here by the boards 50, and the two longitudinal sidewalls by the trough limbs 4 and the lateral sidewalls by the flaps 13. Of course, such a trough car 1, 40 can also be made available without stanchions 55 for suitable cargo. Furthermore, instead of the floorboards 50, it is possible to implement a supporting floor structure which is suitable, by virtue of its surface shape, for receiving piece goods containers, individual goods, special transportation containers, or when transportation rollers or balls are additionally used, also to receive air-cargo pallets and containers. These are secured in the car superstructure 1 by means of suitable securing devices.

In order to increase the trough volume, the car superstructure 1 can, however, also have plate elements instead of the stanchions 55, said plate elements being preferably inserted with web-like prolongations into the stanchion receptacles of the trough element limbs 4. At the end sides, the plate elements are connected to the trough element limbs 5. The plate elements project vertically from the trough element limbs 4, 5 and can be connected to one another in a frictionally locking or positively locking fashion. As a result, a flatcar is easily converted into a bulk goods car.

Figure 13:
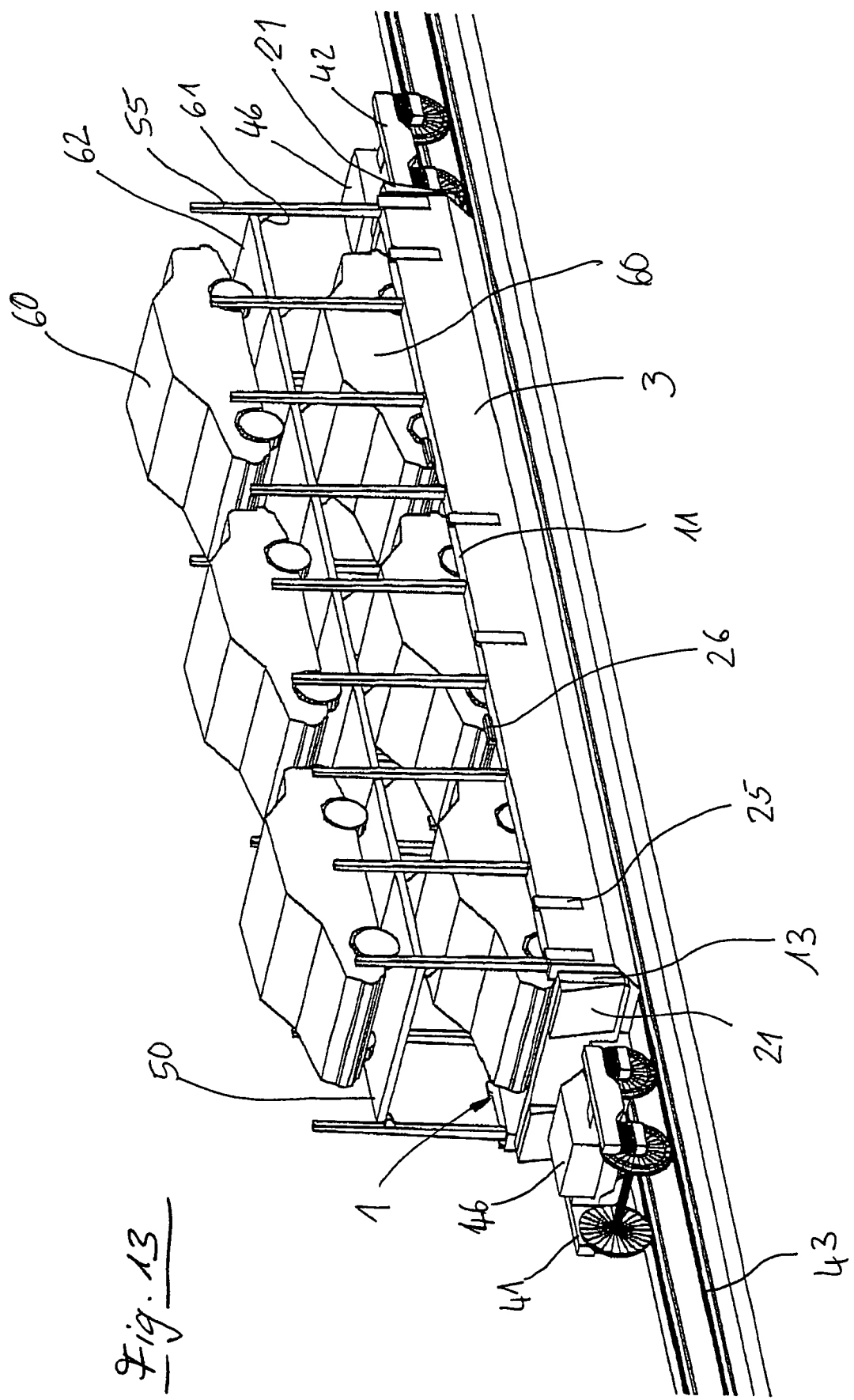
FIG. 13 shows the car according to FIG. 12 as a motor vehicle transporter car.

In a further embodiment of the car 1, 40 according to the invention as in FIG. 13, the latter is embodied as a motor vehicle car, with motor vehicles 60 being parked on a first, lower level, in particular a lowered boarded floor according to FIG. 11 or are placed on the second trough element limbs 5. Such a car 1, 40 has stanchions 55 along the longitudinal edges 11, the stanchions 55 having suitable receptacle means 61 for supporting a second boarded floor 62 composed of further boards 50. The second boarded floor 62 is arranged vertically above the first boarded floor or the plane of the second trough limbs 5 in such a way that the second boarded floor 62 is arranged above the motor vehicle 60. Motor vehicles 60 can thus also be transported on the second boarded floor 62. Of course, it also lies within the scope of the invention not to construct the second boarded floor 62 from individual boards 50 but rather, for example, from running rails or similar suitable supporting floor structures in order to form a supporting structure for motor vehicles.

In what follows, a first embodiment of a loading and/or unloading device according to the invention for cars 1, 40 according to the invention, composed of car superstructure 1 and car frame 40, will be described with reference to FIGS. 14, 15 and 16.

A first embodiment of a loading and/or unloading device 100 according to the invention has a plurality of lifting devices 101 which according to the invention, are arranged on the outside next to the track rails along the tracks 43. For example five lifting devices 101 are provided along a trough element limb 5 and are arranged in such a way that the locomotive and the cars can pass through freely on the tracks 43. The lifting devices 101 are preferably hydraulic or else pneumatic lifting jacks which have a load support 102. The loading and/or unloading device has means for leveling, in particular for horizontally and/or vertically-leveling the car 1, 40 and/or the car superstructure 1 and/or the car frame 40 so that the car frame 40 and/or the car superstructure 1 and/or the entire car 1, 40 can be leveled in all directions, particularly in the horizontal and/or vertical directions, in the direction of travel and transversely with respect to the direction of travel of the car 1, 40. The load support 102 of the lifting devices 101 interacts in each case with the underside of each trough element limb 5 of the trough element 2, 3 in such a way that the car superstructure 1 can be lifted by means of the lifting devices 101 to such an extent that the underside of the trough element limbs 5 lies at the same level as, or preferably somewhat higher level than, the upper side 45 of the longitudinal member 44. The load supports 102 of the lifting devices 101 advantageously have roller elements 103, for example rollers or ball elements, so that after the lifting operation the car superstructure 1 can be displaced onto the load supports 102 in a transverse direction with respect to the direction of travel. A platform (not shown) which has a level corresponding to the level of the upper side 45 of the longitudinal member or the load supports 102 in the extended position of the lifting devices 101 is expediently arranged outside next to the lifting devices 101. This ensures that after the lifting operation a car superstructure 1 can be moved laterally onto the platform by means of the roller elements 103 in a horizontal direction and transversely with respect to the direction of travel. The receptacle region of the car superstructures 1 of the platform is preferably also provided with roller elements 103, for example balls or rollers, so that a car superstructure 1 can also easily be moved in the region of the platform. At least some of the rollers of the load supports 102 and of the platform are driven by motor in such a way that the car superstructure can be moved automatically. Alternatively, some of the rollers of the load supports 102 can be driven by positively locking or frictionally, locking engagement of drive devices on the platform.

The longitudinal member 44 particularly preferably also has roller elements 103 on its upper side 45 so that which is in each case equipped with roller elements 103, a virtually enclosed roller element surface for the loading and unloading is formed by the platform level, the raised load supports 102 and the upper side 45 of the longitudinal support 44 so that the car superstructure 1 is always seated in an easily moved fashion and secured against tilting on a sufficient number of roller elements 103 during the entire loading and/or unloading process. At least selected roller elements 103 of the components of the roller element surface are expediently configured so as to be capable of being driven by motor.

Figure 14:
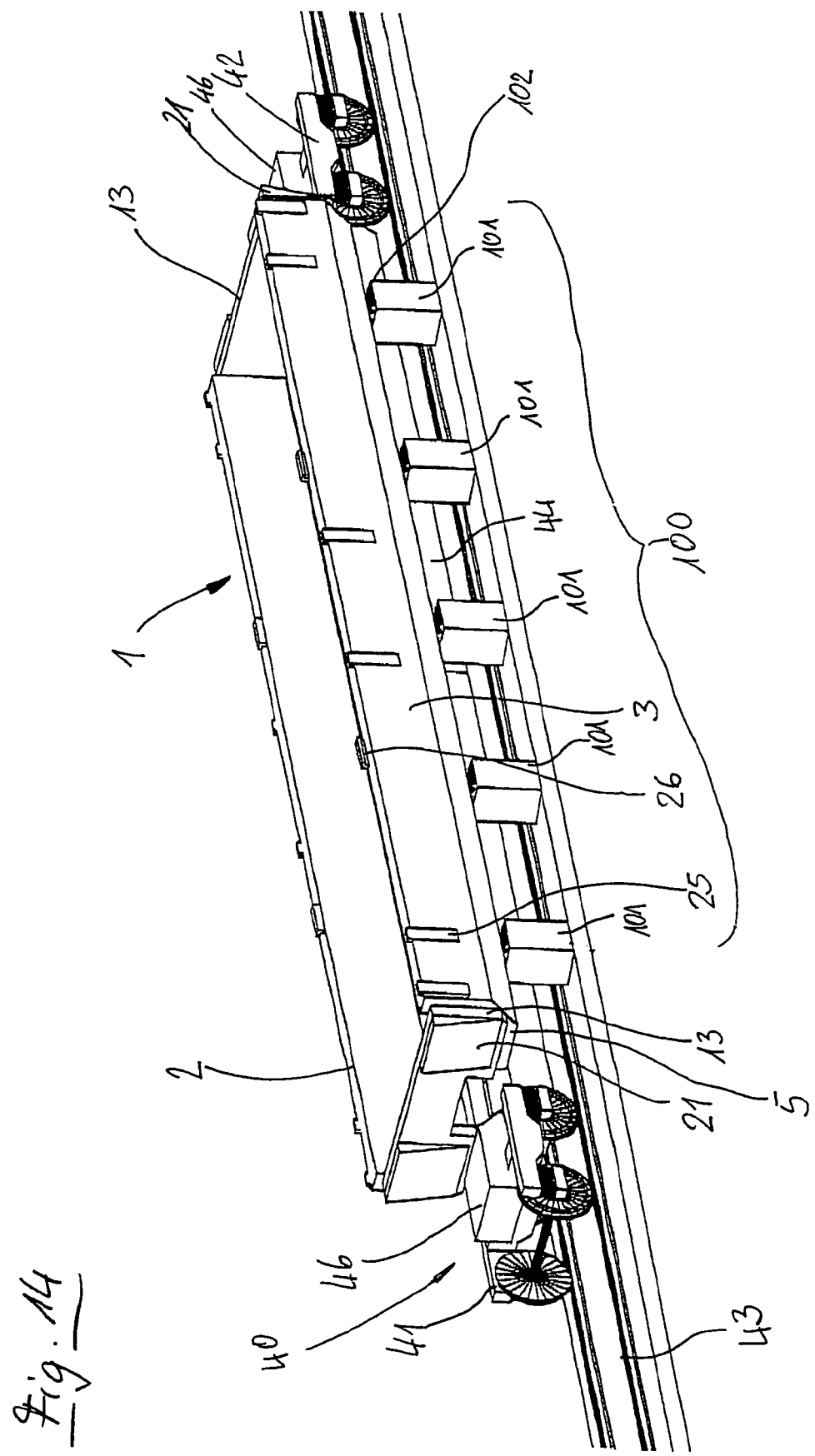
FIG. 14 shows the car according to FIG. 5 in the region of a first embodiment of a loading and/or unloading device according to the invention with a partially raised car superstructure.

The car superstructure 1 is shown in FIG. 14 in a raised state with respect to the longitudinal member 44, the trough element limbs 5 resting on the load supports 102 of the lifting elements 101.

Figure 15:
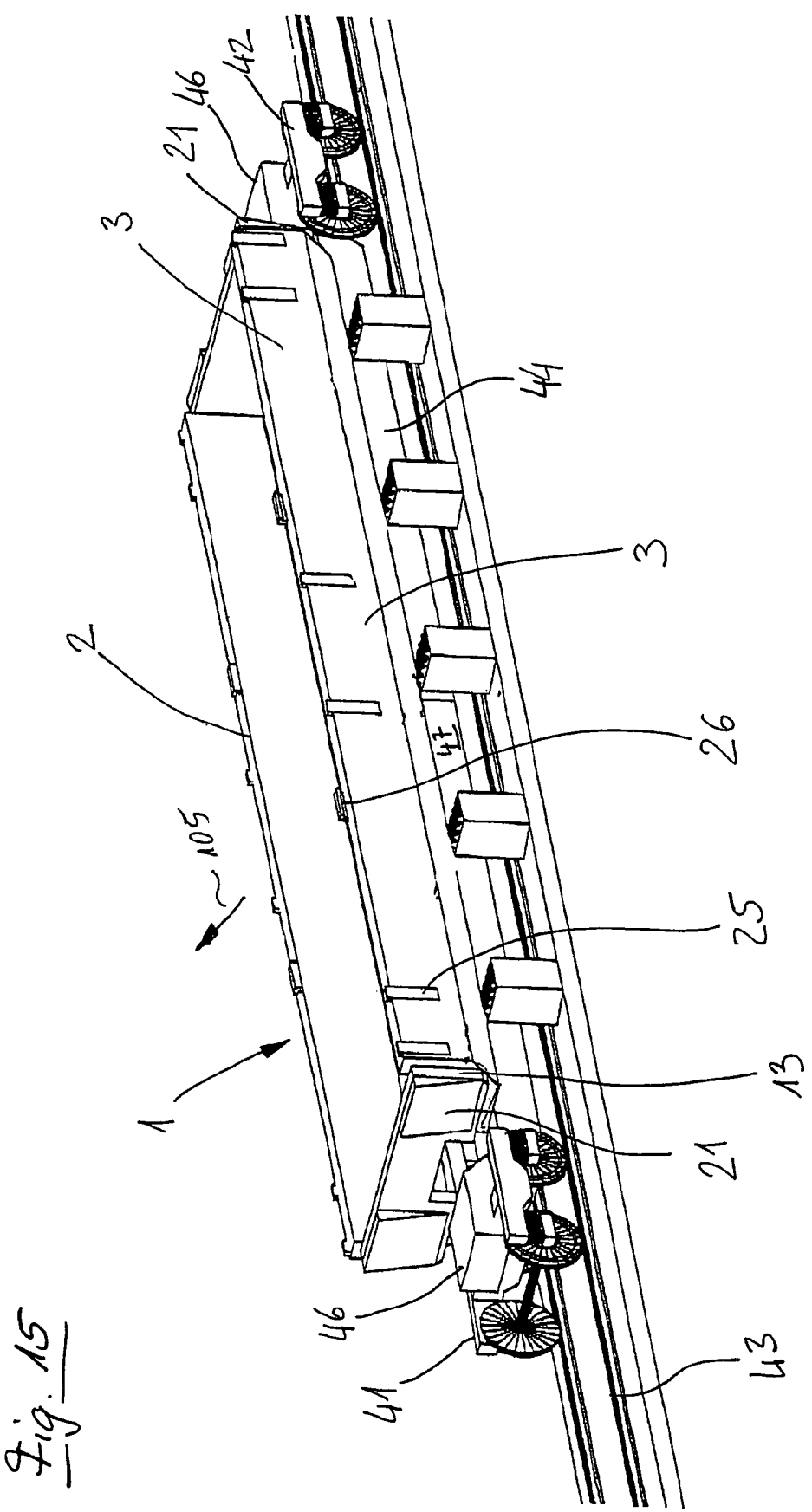
FIG. 15 shows the car according to FIG. 14 with a raised car superstructure and a car superstructure which is shifted to the side to a certain extent.

In FIG. 15, the car superstructure 1 is shown in a raised and partially laterally shifted position transversely with respect to the direction of travel along the lifting and loading direction 105, the car superstructure 1 being moved, in the situation illustrated in FIG. 15, onto a platform (not shown) which is located behind the car 1, 40. At the same time, the second trough element limb 5 of the second trough element 3 is just leaving the load supports 102 and is just being transferred, in the region of the longitudinal edges 10, by roller elements 103 (not shown) on the upper side 45 of the longitudinal member 44.

Figure 16:
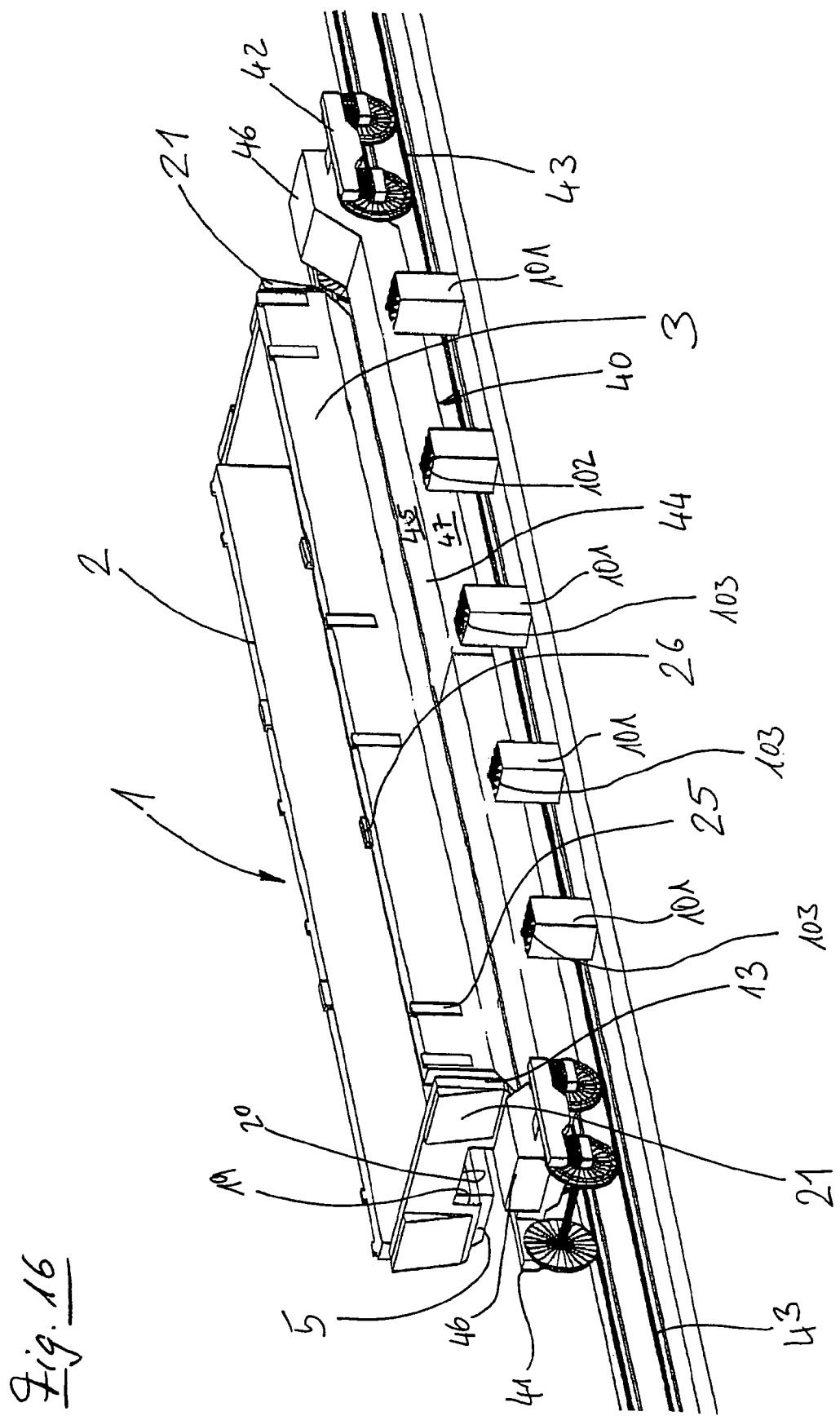
FIG. 16 shows the car according to FIG. 15 with a car superstructure which is further shifted to the side.

In FIG. 16, the car superstructure 1 is already completely next to the longitudinal member 45, the trough element limb 5 of the trough element 2 already being seated on the platform (not shown), and the trough element limb 5 of the trough element 3 being seated on the lifting devices 101 or their load supports 102 lying opposite the lifting devices 101 which are illustrated. Starting from the state according to FIG. 16, the car superstructure 1 can be displaced further until it rests completely on the platform (not shown). The unloading process described above with reference to FIGS. 14 to 16 is carried out in order to load a car frame 40 with a car superstructure 1 in the reverse order, the car superstructure 1 being lowered, after a correct position is reached, in the transverse direction with respect to the car frame 40 by means of the lifting devices 101 and being attached to the car frame 40 by means of suitable attachment or securing devices. The securing devices are preferably embodied as self-locking snap-action devices, the solution being implemented during the lifting process using a transverse force which is derived from the vertical lifting force and triggers, for example, a spring-force-stressed latching operation.

In the first embodiment of the loading and/or unloading device 100 according to the invention it is particularly advantageous that the lifting devices 101 are arranged secured to the track bed next to the cars (1, 40) in their loading and unloading position so that the unladen weight of the cars is reduced and in addition the total number of lifting devices 101 required can be decreased since lifting elements 101 have to be arranged only in the region of the shunting stations, but not on each car frame 40. As a result, the total number of necessary lifting elements 101 can be significantly reduced.

An inventive arrangement of the lifting elements 101 laterally next to the tracks 43 is not made possible according to the invention until the car frame 40 is embodied with the central longitudinal member design described above and the car superstructure 1 has engagement faces (the undersides of the trough element limbs 5 in this case) which can interact with the load supports 102 of the lifting elements 101.

Such a loading and/or unloading device 100 according to the invention could only be achieved in a technically unsatisfactory way with a ladder frame of a car frame according to the prior art. With the loading and/or unloading device according to the invention it is advantageous that it is not necessary to supply the cars with any hydraulic energy or pneumatic energy which is provided in addition to the brake systems, which also contributes to a cost-effective reduction in costs which is desired in terms of expenditure on maintenance. The car frames 40 can, with the exception of the necessary pneumatic systems for the brakes of the wheel sets, be embodied as completely passive cars. As a result, the need for repairs can be reduced and as a result the probability of failure of such a car frame 40 is minimized.

Figure 17:
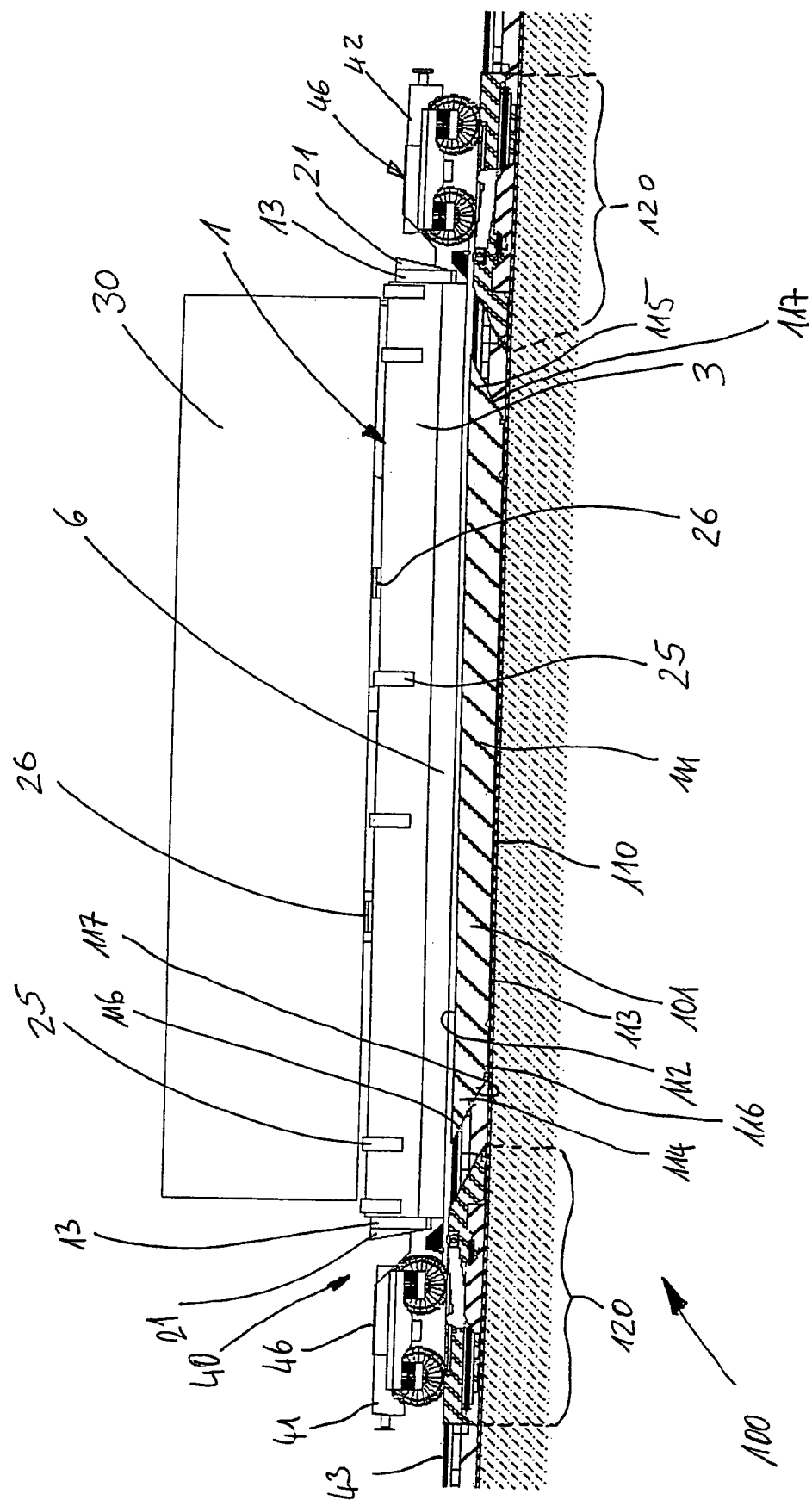
FIG. 17 is a schematic, partially sectionally, overall side view of a further embodiment of the loading and/or unloading device according to the invention.
Figure 18:
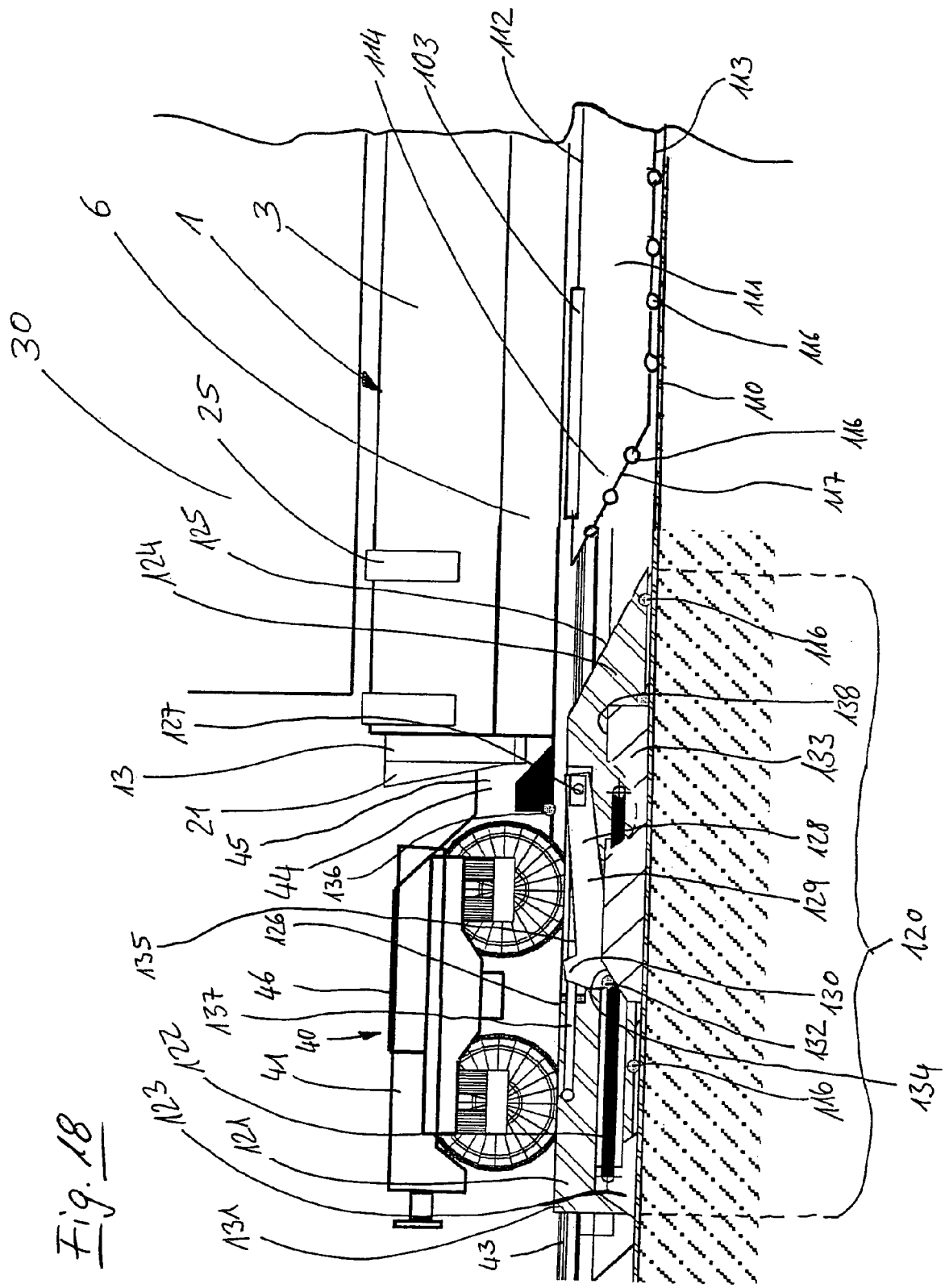
FIG. 18 shows a longitudinal section through part of the loading and/or unloading device according to the invention as in FIG. 17.
Figure 19:
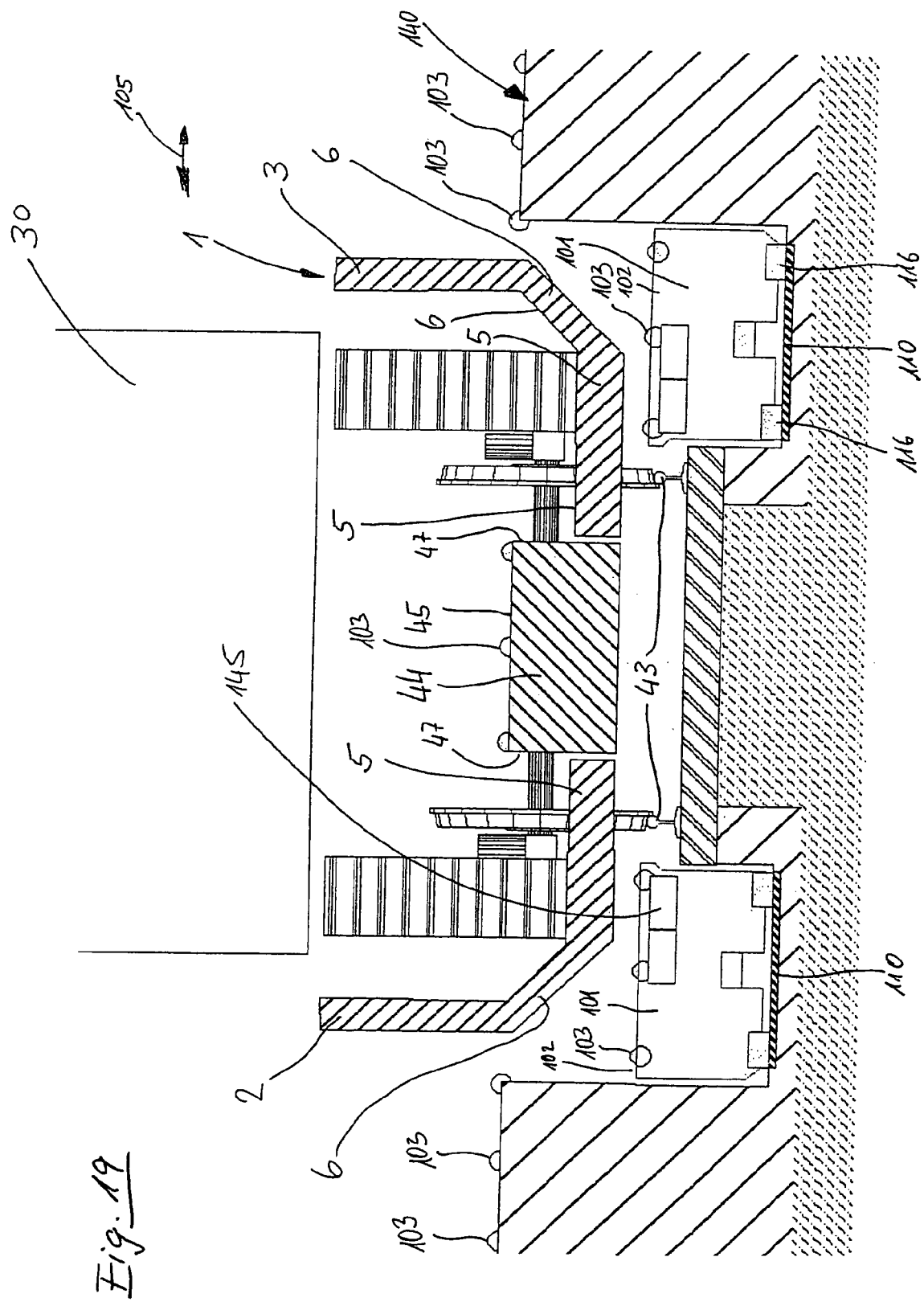
FIG. 19 shows a cross section through a loading and/or unloading device according to the invention as in FIG. 18 in a region between the bogies.

A second alternative embodiment of the loading and/or unloading device 100 according to the invention will be described below with reference to FIGS. 17, 18 and 19.

The second embodiment of the loading and/or unloading device 100 according to the invention has, as lifting device 101, a walking beam 111 which extends outside the rail tracks 43 adjacent to the rail and rests on a roadway 110 which is secured to the ground adjacent to the track bed. The walking beam 111 is essentially rectangular in cross section with an upper side 112, an underside 113 and a first free end 114 and a second free end 115. In the region of the underside 113, supporting rollers 116 are preferably arranged in the region of the free ends so that the walking beam 111 is easily displaceable in its longitudinal direction, which is directed parallel to the direction of the track, on the rolling surface 110.

The free ends 114, 115 are formed projecting at an acute angle with respect to the rolling surface 110 so that ramp faces 117 on the underside are formed and they point to the roadway 110.

Supporting rollers 116 are also arranged in the region of the ramp faces 117.

During the loading and/or unloading process, the walking beam 111 is arranged approximately centrally with respect to the longitudinal extent of the car superstructure 1 underneath the trough element limbs 5, the positioning of the car superstructure 1 together with the car frame 40 with respect to the walking beam 111 being carried out by positioning the car 1, 40 by methods thereof by means of a positioning device 120. Roller elements 103, which correspond to the roller elements 103 on the platform and on the upper side 45 of the longitudinal member 44, are expediently arranged on the upper side 112 of the walking beam 111.

The positioning device 120 has a positioning/lifting carriage 121, spaced apart from the free ends 114, 115 in the longitudinal direction and aligned with the walking beam 111, which positioning/lifting carriage 121 is capable of being displaced on supporting rollers 116 in a driven fashion on the rolling surface 110 parallel to the direction of travel of the car 1, 40. The positioning/lifting carriage 121 is coupled to a, for example, pneumatic, hydraulic or mechanical linear drive 122, the linear drive 122 being connected at one end to the positioning/lifting carriage 121 and being attached at the other end to a stay 123 which is secured to the ground. The positioning/lifting carriage 121 has a first free end 124 which faces one of the free ends 114, 115 of the walking beam 111 and has an opposing ramp face 125 which corresponds to the ramp face 117. The positioning/lifting carriage has an upper side 126 which in the position of rest extends approximately in alignment with the upper side 112 of the walking beam, and in terms of level is arranged underneath the second trough element limb of a car 1, 40 according to the invention.

In the region of the upper side 126 adjacent to the free end 124 a catch hook element 128 with a hook base 129 and a hook projection 130 is arranged so as to be pivotable about an axle 127. The hook base 129 is of longitudinally extended, web-shaped design and extends from the axle 127 approximately over one third of the positioning/lifting carriage 121 from the first free end 124 away in the direction of a second free end 131 of the positioning/lifting carriage 121, wherein the hook projection 130 extends from the hook base 129 at the end for a certain distance in an approximately vertical upward direction. In a position of rest, the catch hook element 128 is arranged in such a way that the hook projection 130 is arranged on or somewhat below the level of the upper side 126 of the positioning/lifting carriage 121.

A guide roller 132, which interacts with a run-up bracket 133 which is secured to the ground and has a ramp face 135, is arranged on the hook base 129 opposite the hook projection 130. The ramp face 134 of the run-up bracket 133 is assigned to the guide roller 132 of the catch hook element 128 is assigned in such a way that in a position of rest the hook projection 130 comes to rest approximately at the level of the upper side 126 of the positioning/lifting carriage 121.

Corresponding to the hook element 128, in particular to an upper edge 135 of the hook base 129, the car frame 40 has, on the side of the longitudinal member 44 in the region of the bogies 41, 42, a corresponding supporting roller 136 which is arranged in such a way that it can interact with the upper edge 135 of the hook base 129.

The catch hook element 128 together with the axle 127 can be moved relative to the positioning/lifting carriage 121 in the longitudinal direction of said positioning/lifting carriage 121 and is damped by means of a spring and/or damping device 137, in particular can be moved to the end 131 of the positioning/lifting carriage 121 with damped prestress with respect to the positioning/lifting carriage 121.

In the following, the previously described loading and/or unloading device composed of the walking beam 111 and positioning devices 120 will be described in more detail with respect to its method of operation (cf. FIGS. 18 and 19). In a first step, the car 1, 40 is roughly positioned in the longitudinal direction with respect to the loading and/or unloading device 100 by defined stopping of the train locomotive at a predetermined location. After the car 1, 40 comes to a standstill the linear drive 122 of the positioning/lifting carriages 121 is activated so that the positioning/lifting carriage 121 is moved from its initial position according to FIG. 18 in the direction of the walking beam 111. In the process, on the one hand the opposing ramp faces 125 and the ramp faces 117 move closer to one another and on the other hand the guide roller 132 of the catch hook element 128 runs onto the ramp face 134 of the run-up bracket 133 so that the catch hook element 128, in particular the hook projection 130 and part of the upper edge 135 of the hook base 129 is lifted to a level above the upper side 126 of the positioning/lifting carriage 121. As a result, part of the upper edge 135 and the hook projection 130 thus project beyond the positioning/lifting carriage 121. In this position, the catch hook element 128 remains stationary in relation to the position/lifting carriage 121, which is brought about by the fact that the guide roller 132 rolls on a horizontal upper edge 138 of the run-up bracket 133. After the positioning device 120 has moved a specific distance, the upper edge 135 of the catch hook element 128 moves into contact with the supporting roller 136 which is secured to the car, the upper edge 135 of the catch hook element 128 forming a sloping ramp for the supporting roller 136. By simultaneously moving two positioning devices 120 toward one another on each side of the car, the car which is guided by the car couplings with a relatively large amount of play is finely positioned in the longitudinal direction in the center with respect to the positioning devices 120. In addition, the simultaneous activation of all four positioning devices 120 at each "corner" of a car 1, 40 causes the supporting rollers 136 of the cars 1, 40 to be moved horizontally in its longitudinal and transverse directions to the same level, i.e. moved into a defined horizontal vertical position. This is necessary in particular when there is unequal loading of the car superstructure 1 since different spring compression of the bogies due to an uneven distribution of weight can result in a different vertical level of the four supporting rollers 136 on the car.

As a result, a car 1, 40 is pre-positioned in a defined fashion by actuating the positioning devices 120 both in the longitudinal direction with respect to the tracks 43 and in the vertical direction, when the supporting rollers 136 bear on the upper edge 135 and strike against the hook projection 130.

After the longitudinal and vertical positioning have taken place, the positioning/lifting carriage 121 is moved further in the direction of the walking beam 111, as a result of which the catch hook element 128 is moved toward the second free end 131 relative to the positioning/lifting carriage 121 by the spring/damper unit 137 while resting prestressed against the supporting roller 136. After the positioning/lifting carriage 121 has moved a certain further distance, the opposing ramp face 125 meets the roller elements 116 of the ramp face 117, with the walking beam 111 being lifted by the positioning/lifting carriage 121 out of its position of rest in the manner of a move-under wedge until the roller elements 103 on the upper side 112 of the walking beam 111 enter into contact with the underside of the second trough element limbs 5. The opposing ramp face 125 and the ramp face 117 are matched in their degree of incline and length in such a way that when the positioning/lifting carriage 121 has moved completely or virtually completely underneath the walking beam 111, the car superstructure 1 can be lifted, by its underside, to a level of the platform 140 (cf. FIG. 19). When the car superstructure 1 has reached the desired platform level, the linear drive 122 of the positioning/lifting carriages 121 is stopped so that the car superstructure 1 can be moved laterally away from the car frame 40 and placed on the platform 141 by means of suitable devices. According to one particularly preferred embodiment, at least some of the roller elements 103 which are arranged on the upper side 112 of the walking beam 111 can be driven by means of suitable drive devices 145 so that the car superstructure 1 can be moved away from the car frame 40 by motor in a transverse movement.

Likewise, it is, of course, possible to drive individual roller elements 103, or a plurality thereof, on the platform.

Furthermore, it is possible, when a car frame 40 is present, to cause a car superstructure 1 to simply move transversely from one side of a platform to the other side of the platform by means of the walking beams 111, the car frame 40. With the car superstructures according to the invention it is particularly advantageous that they are suitable both for a transverse loading process and/or transverse unloading process (illustrated above) and for loading in a conventional way by means of gantry cranes or stacker trucks by virtue of the gripping edges 26.

It lies within the scope of the invention to replace the lifting devices described above by other suitable lifting devices, for example lever arrangements or scissor-type arrangements. The drives of these lifting devices can also be provided by means of cylinder rods, tooth racks, screw rods, belts, toothed belts or other gear mechanisms or nontoothed push rod/pull rod structures.

A third embodiment of the loading and/or unloading device will also be described, having lifting devices which have walking beams 221 which are oriented transversely with respect to the longitudinal direction of the tracks of a track body 243, and preferably horizontally. The walking beams 221 are in particularly of displaceable design. The transversely displaced walking beams 221 preferably engage in the cars 1, 40. The car 1, 40 can be centered by means of the walking beams 221.

In one embodiment, walking beams 221 which lie opposite one another and which can be displaced one on top of the other form a bridge, either alone or in conjunction with the car 1, 40. The car superstructure 1 can be displaced on the bridge so that, for example, a car superstructure 1 on the bridge can cross the track body 243.

In one preferred embodiment, the lifting devices bring about only a small degree of travel of, for example, only a few centimeters when the lifting devices are extended into a working position. The short travel compensates, for example, mechanical tolerances and/or differences in the spring compression of the bogies 46 of the car 1, 40.

In one embodiment, the walking beams 221 are arranged horizontally. The walking beams 221 are oriented transversely with respect to the longitudinal direction of the rail. In a position of rest, the walking beams 221 are retracted. In the position of rest, the walking beams 221 are located outside a region of the track 43 which is predefined by valid profile limits for goods traffic by rail.

The walking beams 221 have a ramp face 225 at each of their free ends, said ramp face 225 being provided for engaging with an associated corresponding face 217 which is formed on the car longitudinal member 244. When the ramp face 225 of the walking beam 221 is placed in an engagement with the assigned corresponding face 217 of the car longitudinal member 244, the car longitudinal member 244 is preferably centered horizontally and vertically and in the longitudinal direction. The car longitudinal member 244 can particularly preferably be secured by interaction of the walking beams 221 with the car longitudinal member 244.

The walking beams 221 are configured for a horizontal extension/retraction movement. The walking beams 221 are moved into the working position by moving them horizontally and/or transversely with respect to the longitudinal direction of the rails on support rollers, in particular in roadways which are secured to the platform. The opposing ramp faces 217 are embodied on the car 1, 40, in particular on the car longitudinal member 244, in such a way that the opposing ramp faces 217 correspond to the ramp faces 225 of the walking beams 221. The horizontal extension movement generates the short travel by interaction of ramp faces 225 of the walking beams 221 and opposing ramp faces 217 on the car 1, 40.

The walking beams 221 are preferably embodied in such a way that when the ramp faces 225 of the walking beams 221 interact with the opposing ramp faces 217 of the car longitudinal members 244 they form one plane in which supporting faces 212 of the walking beams 221 and the supporting faces of the car longitudinal member 244 are arranged. The supporting faces 212 of the walking beams 221 are aligned with the supporting face of the car longitudinal member 244. The plane preferably lies at the same height as the unloading surface of the platform 240, or somewhat below it. The walking beams 221 are particularly preferably embodied in such a way that the walking beams 221 can be extended by lifting devices 201, which are arranged on both sides of a track body 243, in such a way that the supporting faces 212 of the walking beams 221 form an enclosed roadway on which a car superstructure 1 can be displaced from a first unloading surface on a first side of the track body 243 over the track and onto a second unloading surface on the other side of the track body 243.

In one embodiment, the walking beams 221 are each moved before the start of a loading and/or unloading phase. If the walking beams 221 have been extended into the working position, the height of an upward pointing supporting face of the walking beam 221 corresponds to the height of a downward pointing contact area of the car superstructure 1 which is arranged on the car longitudinal member 244.

In one embodiment, the car superstructure 1 is supplied with power and/or signals by means of the lifting devices. In one embodiment of the invention, the lifting devices have terminals for supplying mechanical, electrical, pneumatic or hydraulic drive power. The lifting devices preferably have terminals for transmitting electrical, electronic and/or optical and/or mechanical signals. In particular, the terminals are designed to connect to corresponding terminals on the car superstructures 1. The terminals can preferably be connected to the car superstructures 1 by means of the walking beams 221. The terminals are particularly preferably embodied as coupling elements which are mounted in a displaceable fashion on the walking beam 221. For example, the displaceable mounted coupling elements are moved on the walking beams in the direction of the car 1, 40 when the car 1, 40 is centered and/or secured by the walking beams 221. In one embodiment, the coupling elements which have been moved to the car 1, 40 can be connected at correspondingly designed mating coupling elements of the car superstructures 1.

In one embodiment, the loading and/or unloading device has a device for forming a supporting film. The supporting film is embodied here in particular as a supporting film of fluid. The device can be formed on a supporting face for the car superstructure 1, the supporting face extending on the loading and/or unloading device and on the car superstructure 1. In this embodiment, the car superstructure 1 can be moved on the supporting film in a way which is particularly low in friction above the car frame and/or the loading and/or unloading device.

All the drive units referred to may be embodied by electrical, electromagnetic, hydraulic or pneumatic means. Furthermore it is expedient to generate and make available the drive power for all the drives of the loading and/or unloading device according to the invention in a central fashion. The drive power for all the loading and/or unloading devices can be generated centrally by loading stations with one or more loading points. It is particularly advantageous with the loading and/or unloading method according to the invention that the horizontal leveling of the cars 1, 40 is carried out directly before the actual lifting process of the car superstructure 1, the leveling being carried out in a first phase and the lifting being carried out in a second phase of a uniform movement of the lifting device.

Furthermore, it is advantageous that the cars are secured in the longitudinal direction during the lifting and unloading process and that after a loading process has ended the cars are automatically released again by the loading and/or unloading device moving back into its home position. The control and the sensing of the signals which are necessary to control the system is expediently brought about from the platform. However, an embodiment on a train is also conceivable.

In one embodiment of the invention, the lifting devices 201 have connections for supplying mechanical, electrical, pneumatic or hydraulic drive power. The lifting devices 201 preferably have connections for transmitting electrical, electronic and/or optical and/or mechanical signals. In particular, the terminals are designed for connection to corresponding mating terminals on the car superstructures 1. The terminals can preferably be connected to the car superstructures 1 by means of the walking beams 221.

The terminals are particularly preferably embodied as coupling elements 222 which are mounted in a displaceable fashion on the walking beam 221. For example, the coupling elements which are mounted in a displaceable fashion can be moved on the walking beams 221 in the direction of the car 1, 40 if car 1, 40 is centered and/or secured by the walking beams 221. In one embodiment, the coupling elements which are moved to the car 1, 40 can be connected to mating coupling elements of the car superstructures 1 which are of corresponding design.

In one embodiment, the loading and/or unloading device is configured so that power and/or signals which are transmitted pneumatically, electrically, hydraulically and/or mechanically to the car superstructures 1, control and drive movements of the flaps 13 of the car superstructures 1 and/or of the supporting means for containers and semitrailers 30 (interchangeable bridges), or lock or unlock the car superstructures 1. For example, mobile couplings 222, which are driven by electrical or hydraulic actuating motors, on the walking beams 221 are configured to connect onto the car superstructures 1 and to carry power and/or signals to the car superstructures 1. The couplings 222 which are driven by actuating motors are preferably configured to displace the car superstructures 1 onto the unloading surface by means of the walking beams 221. In one embodiment, the couplings 222 are configured to generate the film of fluid on the loading and/or unloading surface and/or under the car superstructure 1.

The couplings 222 which are arranged on the walking beam 221 in a moveable fashion preferably each have a control unit which has a central processing unit, an input means, for example a keyboard and/or a card reader device, as well as an output unit, for example with a visual and/or audible display. The control unit permits, for example, operation by operating personnel, for example drivers of the trucks 250, and individual control of and feedback from the loading and/or unloading process. In one preferred embodiment, the moveable couplings 222 are connected by means of a network, in particular a stationary network, to a central computer which is configured, for example, to control the throughput of goods automatically.

In one embodiment, the loading and/or unloading device has a heater which is configured to heat the surface of the walking beams 221 and/or the underside of the car superstructures 1, and preferably the upper side of the car longitudinal members 44. For example, the heating device is configured as an electric heater. In one embodiment, the heating device is designed to generate warm compressed air. In a further embodiment, the loading and/or unloading device has a mechanical cleaning device. The heating device and/or the cleaning device are provided for keeping the loading and/or unloading device clean, dry and free of ice.

The sequence of the method according to the invention will be explained below with reference to the figures.

Figure 20:
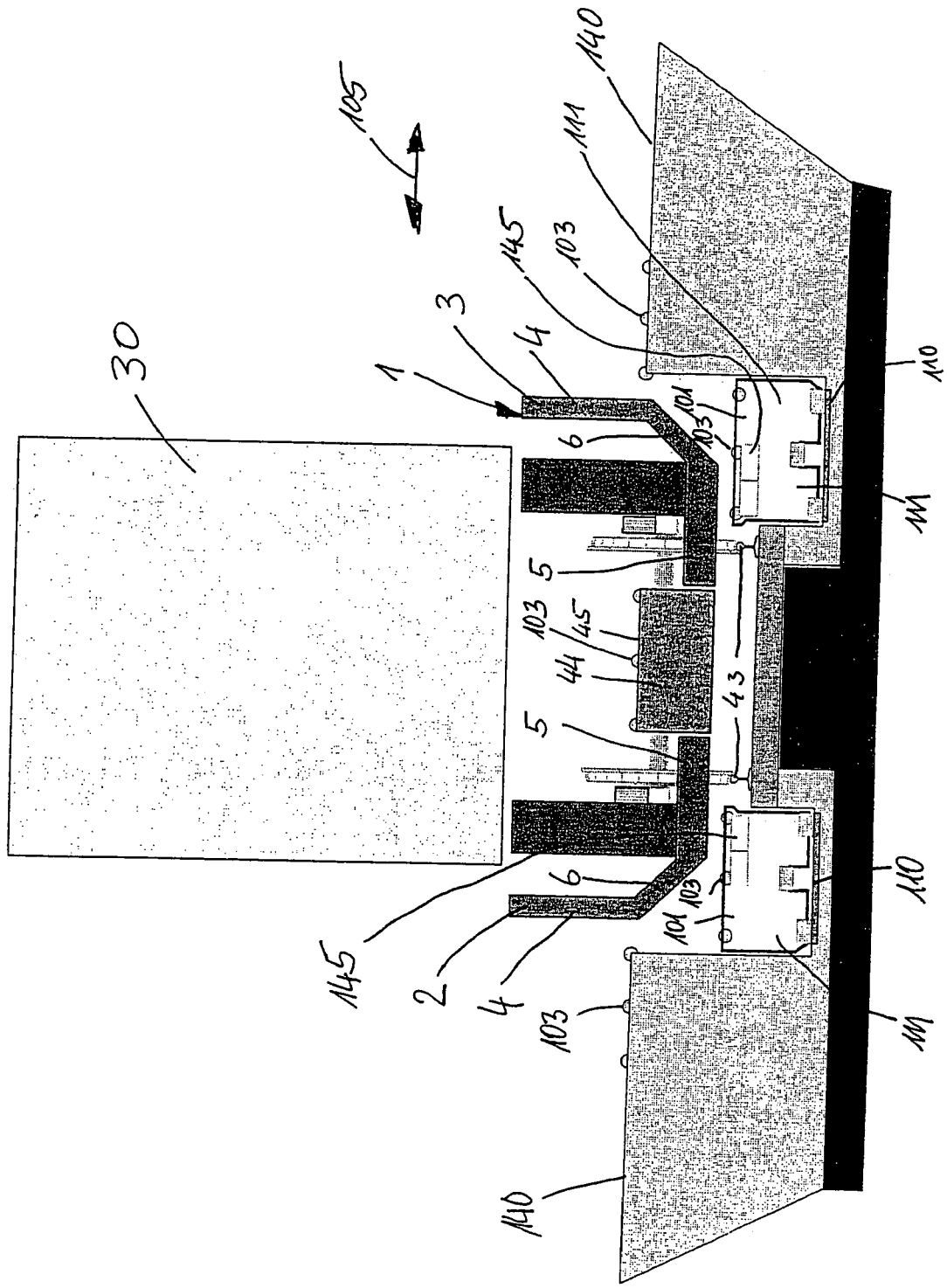
FIGS. 20 to 25 are schematic diagrams of the chronological sequence of an unloading process according to the method in accordance with the invention with a loading and/or unloading device according to the invention and a car frame according to the invention and a car superstructure according to the invention.

In an initial situation, a car 1, 40 travels into a corresponding loading and unloading area of a train station (FIG. 20) and at the same time travels across walking beams 111 which are located in their home position on the roadway 110.

In a first step, which is not shown in the figures, the above-described positioning in the longitudinal and vertical directions by the positioning/lifting carriages 121 takes place. The positioning is preferably carried out simultaneously and in parallel for all the cars of the train configuration.

Figure 21:
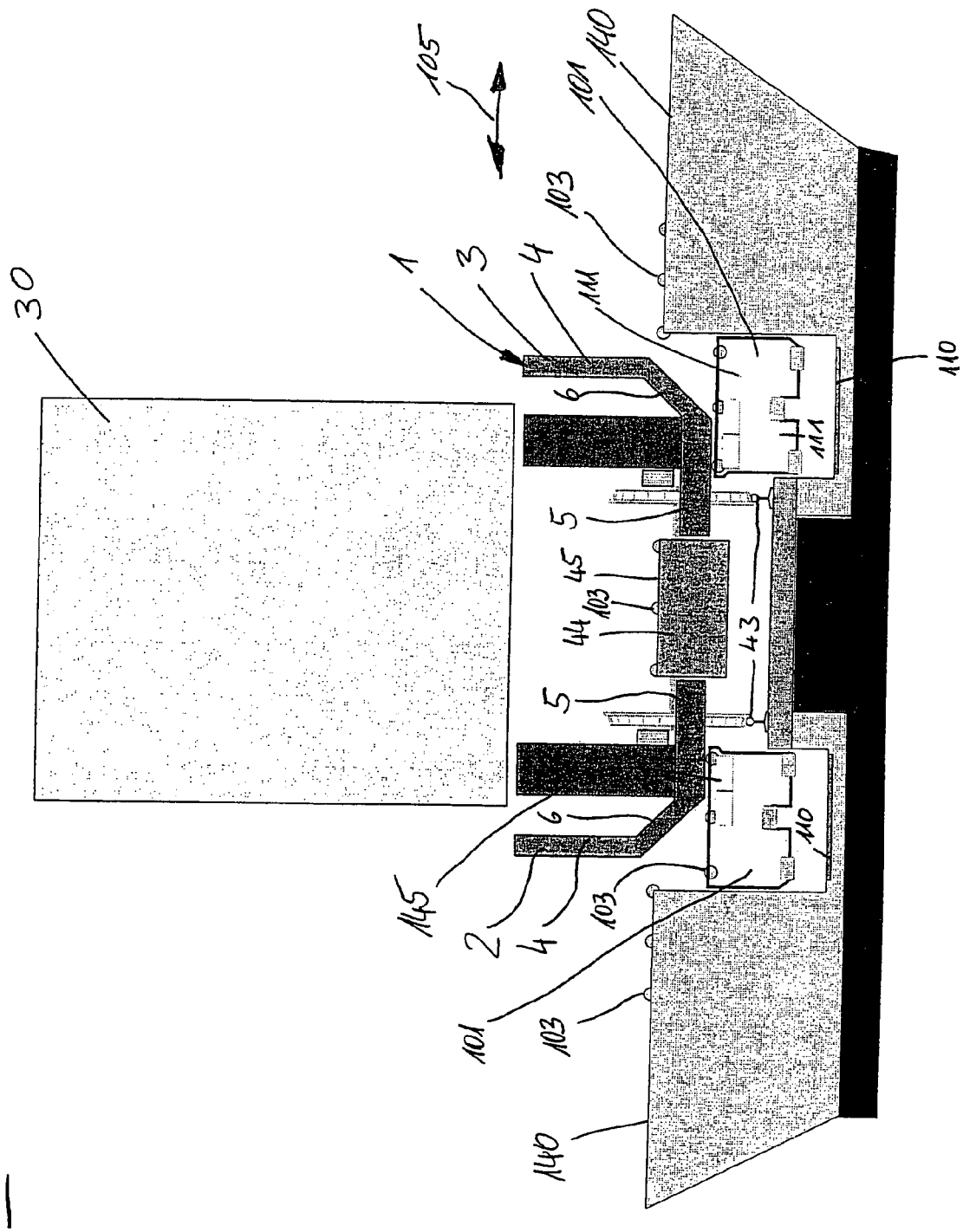

The walking beams ill are subsequently lifted off from the roadway 110 by the positioning/lifting carriages 121 until they reach the underside of the second trough element limbs 5. A partially raised position of the car superstructure 1 according to FIG. 21 is reached by further movement of the positioning/lifting carriages 121.

Figure 22:
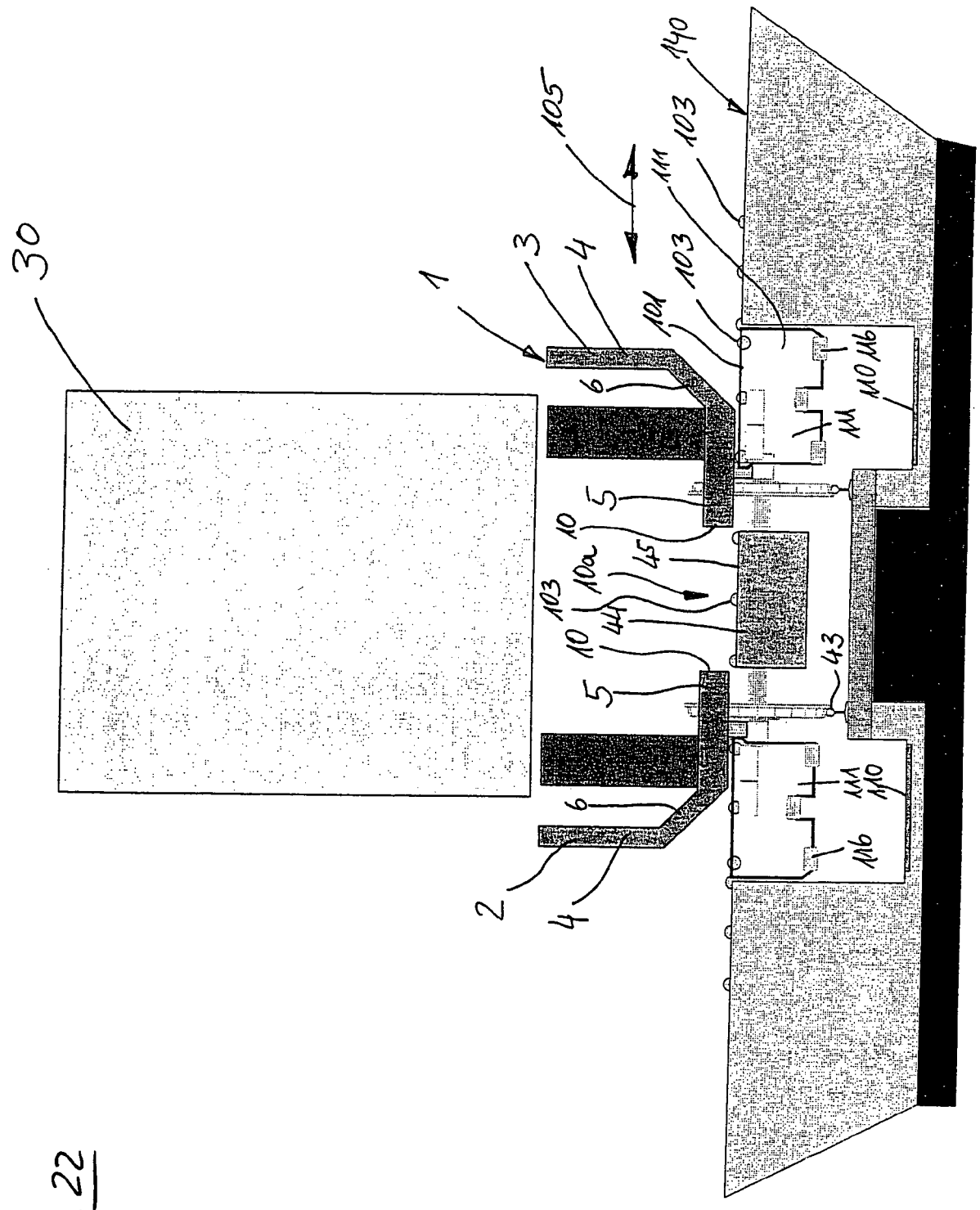

In one end position of the positioning/lifting carriages 121 the walking beams 111 are at a platform level of the platform 140 (FIG. 22) so that the roller elements 103 of the platform 140, the walking beam 111 and the longitudinal member 44 form one rolling plane, the maximum distances between roller elements 103 in the transverse direction being smaller than the extent of the second trough element limbs 5 in the transverse direction so that it is ensured that the car superstructure 1 is always guided in a way which is secured against tilting.

Figure 23:
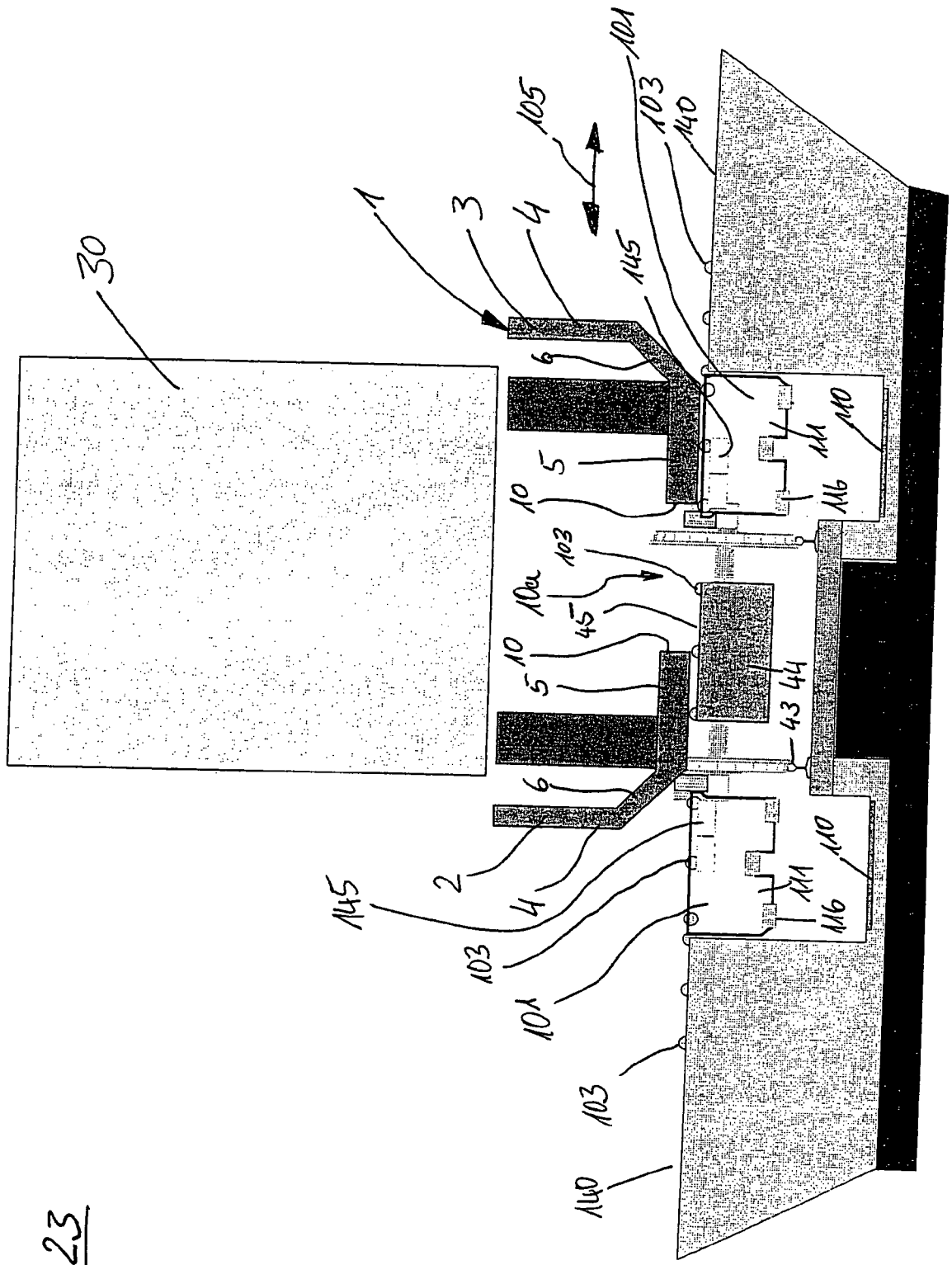
Figure 24:
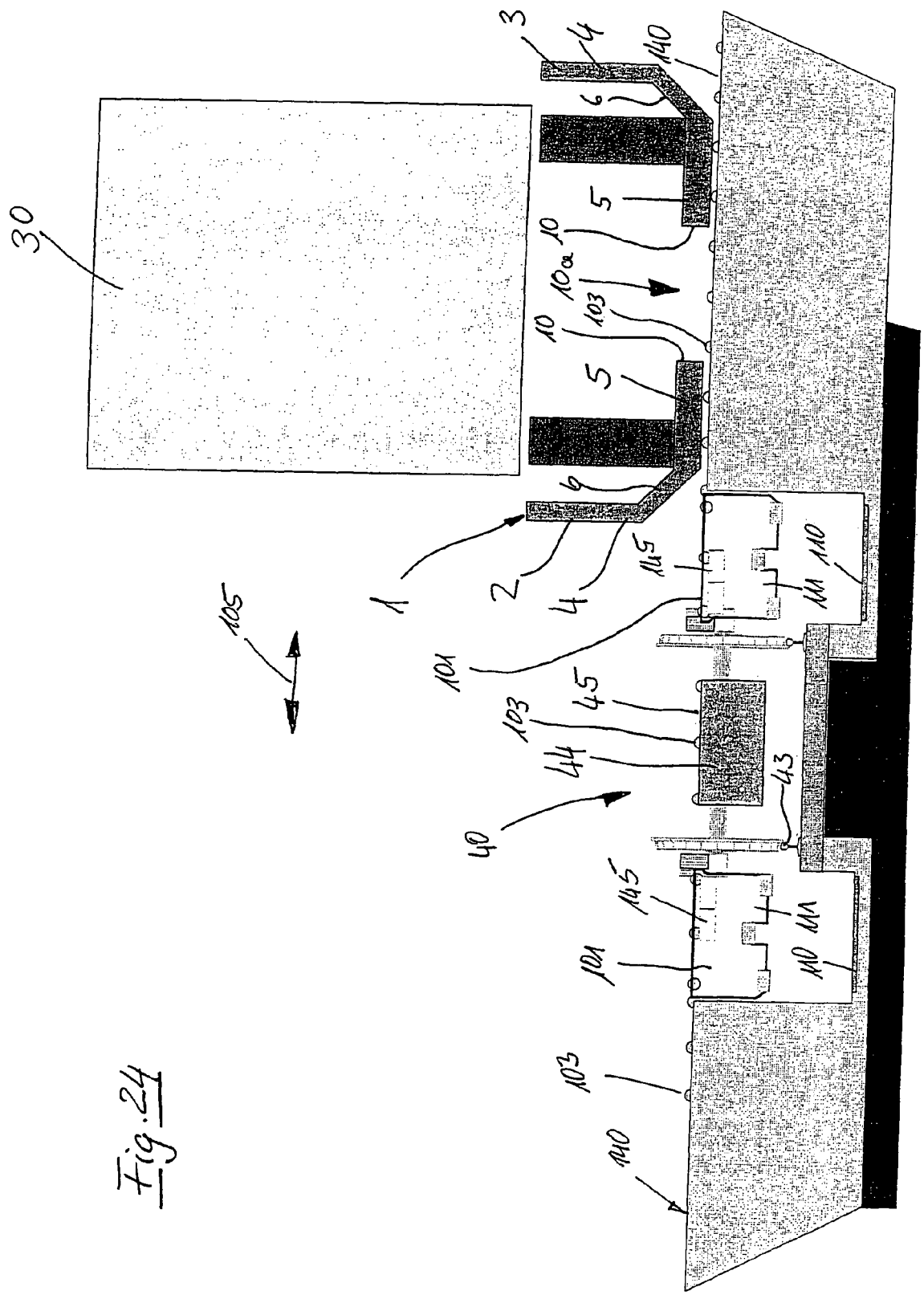
Figure 25:
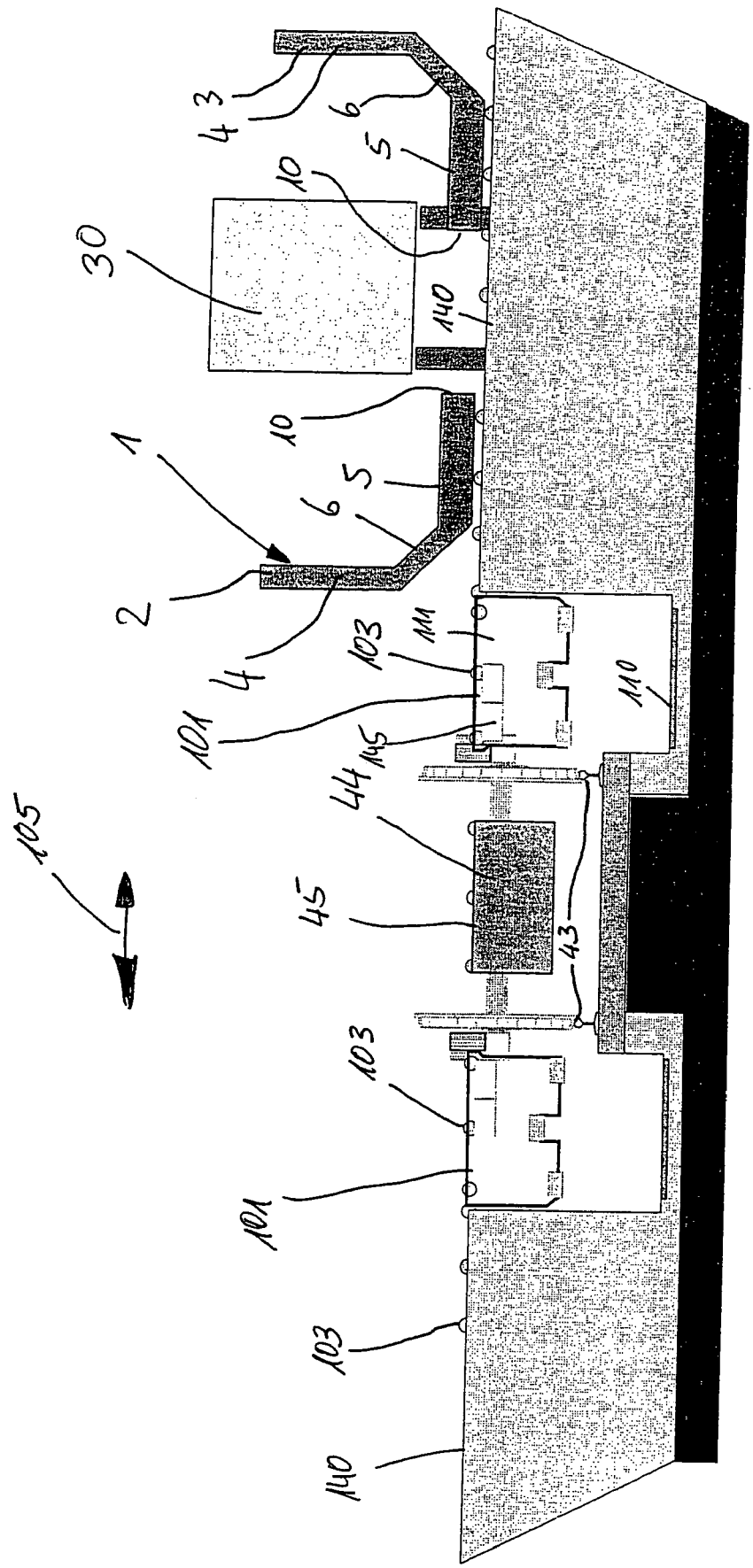

After the platform level has been reached, the car superstructures 1 can be shifted laterally by means of the drives 145 (FIG. 23). After the shifting process, the car superstructure 1 together with the cargo, for example a truck semitrailer 30, is located completely on the platform 140 (FIG. 24). The car frame 40 is ready to receive another car superstructure 1. After the "exiting" car superstructures 1 have been put down on the platform 140 (FIG. 25) or after the car frames 40 have been loaded with other car superstructures 1, the train can depart again and the flaps 13 and the run-up ramp elements 21 can be placed on the platform 140 on the floor of the platform so that a truck power unit (not shown) can couple to the truck semitrailer 30 and can pull it from the car superstructure 1. This process, like the loading of the car superstructure 1 with any desired load goods is dependent on the presence of a car or train configuration.

With the method according to the invention and the devices according to the invention it is particularly advantageously possible to load the vast majority of truck trailers (trailers or semitrailers or trailers for receiving containers or interchangeable bridges) which are not approved for loading by crane, in such a way that the drivers or the traction engine do not need to be in situ during the loading process. This results in low forwarding and transportation costs since the traction engines and their drivers can leave the station again immediately after putting down the semitrailers. It is also advantageous that the loading and unloading of the cars 1, 40 can take place simultaneously with the loading and unloading of further cars, or of all the cars, of a train configuration. The transfer of a the load goods which are attached to the car superstructures, or a part of the load goods or the reception or transfer of an individual item of load goods is thus possible in the same time period of approximately 5 to 10 minutes. In this way, an entire train with, for example, thirty semitrailers, can be unloaded in this very short time and then loaded with thirty other semitrailers. It is precisely this parallelism that makes possible a significant advantage of the invention compared to a conventional sequentially operating terminal crane which would take between two and three hours to unload and load such a train unit.

In the following, the sequence of the loading method will be explained with the third embodiment of the loading and unloading device according to the invention which is described above and in which the lifting and displacement devices 201 are arranged secured to the platform.

A car 1a, 40 is moved into the loading and unloading area between the lifting and displacement devices 201 which are arranged on both sides of the track body 243. The car 1a, 40 stops next to a car superstructure 1b which is to be loaded. The walking beams 221 are extended horizontally out of the position of rest into the working position in a transverse direction with respect to the tracks of the track body 243 (FIG. 28, arrows A). The ramp faces 225 at the free ends of the walking beams meet the opposing ramp faces 217 at the car 1a, 40. The ramp faces 225 interact with the opposing ramp faces 217 in such a way that the car 1a, 40 is secured and the car superstructure 1a is lifted slightly, while mechanical tolerances and differences in the spring compression of the car 1, 40 are essentially compensated.

The couplings 225 are connected to the car superstructures 1a, 1b on the platform 240b or on the car frame 40. The couplings 222 displace the car superstructures 1a, 1b transversely (FIG. 29, arrows B) so that the car superstructure 1a moves from the car frame 40 onto the platform 240a, while the car superstructure 1b moves from the platform 240b onto the car frame 40.

The walking beams 221 are moved out of the working position into the position of rest (FIG. 30, arrows C). The car 1b, 40 is moved out of the loading and unloading region.

In one embodiment of the method according to the invention, one or more car superstructures 1 of a train are moved, together with cargo 30 which may be located thereon, from the car or cars 1, 40 onto an unloading surface 140. This is carried out, for example, by means of the lifting and displacement devices of the first or second embodiment, which are anchored to the track bed.

Directly after this, or at a later time in another embodiment of the method, the car superstructures 1 are moved onto a further car which is preferably embodied according to the invention. The further car is arranged, for example, on a track which adjoins the unloading surface. In one embodiment, the further car is arranged on the same track as the first car. The further car is preferably secured by means of further or the same lifting and displacement devices. As a result, the car superstructures can be changed, if appropriate together with cargo located on them, from a first train over to a second train in a particularly largely automated fashion. One preferred application of this embodiment is a change of gauge for a train. "Change of gauge" is to be understood according to the invention to mean that the cargo of the train with a first gauge is loaded onto a second train with a second gauge which is different from the first gauge. For example, with the method according to the invention it is possible to change the gauge of a train at the border between the European Union and Eastern Europe. With the method according to the invention it is also possible to change the gauge of a train at the border between France and Spain. The change of gauge of one or more, in particular of all, the car superstructures of the first train is preferably carried out at the same time or at least in a chronologically overlapping fashion. However, a change of gauge can also be carried out individually car by car and in a way which does not overlap chronologically.

Furthermore, in addition to the semitrailers, it is possible to load containers or other load goods, for example stacks, rolls, bulk material, unit loads, special transportation goods, air freight pallets or containers, changeable flatbed bodies or tree trunks efficiently and quickly onto rail cars in this way during a brief train stop.

The invention is not restricted to the illustrated exemplary embodiments but rather comprises all the embodiments acting identically within the sense of the invention. It would be conceivable, for example, for the lifting device to be configured such that only simultaneous lifting of the car superstructure at a plurality of points unlocks safety latches (not illustrated). These are arranged here on the longitudinal member 44 of the car and engage in the car superstructure 1 in such a way that the latter is securely connected to the longitudinal member during travel. The lifting device can however also have sensors which detect correct locking of the safety latches in a redundant fashion. This would ensure that the car superstructures are reliably connected to the longitudinal members when the all-clear indication for departure of the train is issued.

The invention claimed is:

1. A method for loading and unloading rail cars, comprising the steps of moving at least one car having a car frame (40) and a car superstructure (1) and traveling on a rail track (43), supported on a track bed having an inter-rail track bed portion located between the rails of the rail track and lateral track bed portions adjacent to each rail beyond said inter-rail track bed portion, into a loading and unloading position, and:

for unloading the rail car, lifting, by means of lifting devices (101, 111) anchored directly to the lateral track bed portions, the car superstructure (1) off from the car frame (40) to an unloading level, and moving the car superstructure (1) at the unloading level in a transverse direction with respect to a longitudinal plane (7) of the car and seating the car superstructure (1) completely on a loading and unloading face (140), and for loading the rail car, moving the car superstructure (1) from the loading and unloading face (140) in a transverse direction with respect to the longitudinal plane (7) of the car to above the car frame (40) and lowering, by means of lifting devices (101, 111) anchored directly to the lateral track bed portions, the car superstructure (1) onto the car frame (40) which is located in the loading and unloading position.

2. The method as claimed in claim 1, characterized in that the car (1, 40) is roughly pre-positioned for the loading and unloading operations by means of a train lock, and finely positioned in the loading and unloading position by means of a positioning device (121).

3. The method as claimed in claim 1, comprising the step of leveling the car (1, 40) horizontally in the longitudinal and transverse directions before lifting the car superstructure (1).

4. The method as claimed in claim 3, comprising the step of horizontally leveling the car by a positioning device (120) acting on the car frame (40).

5. The method as claimed in claim 3, comprising the steps of horizontally leveling the car (1, 40) directly before lifting the car superstructure (1), wherein the leveling is carried out in a first phase and the lifting in a second phase of a uniform movement of the lifting devices (111).

6. The method as claimed in claim 1, comprising the step of lifting the car superstructure (1) to a platform level (140).

7. The method as claimed in claim 1, comprising the step of securing the car frame (40) in a direction of travel during the loading and unloading operations.

8. The method as claimed in claim 1, wherein the car superstructure is loaded and unloaded on a platform (140) independently of the presence of a car frame (40).

9. The method as claimed in claim 1, comprising the step of guiding the car superstructure (1) to secure the car superstructure (1) against tilting throughout the loading and unloading operations.

10. The method as claimed in claim 1, comprising the step of releasing the car frame (40) automatically in a direction of travel after the loading and unloading operations have ended.

11. The method as claimed in claim 1, wherein a first car is moved into the unloading position and a second car having a second car frame is moved into the loading position, characterized by the steps of:
   lateral pushing of the car superstructure (1) off the car frame of the first car, and
   lateral pushing of the car superstructure onto the car frame of the second car.

12. The method as claimed in claim 11, characterized by the step of:
   arranging the second car frame next to the first car frame in such a way that the car superstructure (1) is pushed onto the second car frame, while the car superstructure is pushed off from the first car frame (40).

13. A method for transferring cargo from a first train traveling on a first rail track (43), supported on a first track bed having an inter-rail track bed portion located between the rails of the first rail track and lateral track bed portions adjacent to each rail beyond said inter-rail track bed portion, to a second train traveling on the first rail track (43) or on a second rail track, supported on a second track bed having an inter-rail track bed portion located between the rails of the second rail track and lateral track bed portions adjacent to each rail beyond the inter-rail track bed portion of the second rail track, comprising the steps of:
   moving the first train with at least a first car (1, 40), which comprises a car frame (40) and a car superstructure (1) with the cargo, into an unloading position,
   lifting the car superstructure (1) off the car frame (40) by means of first lifting devices (101, 111), wherein the first lifting devices (101;111) are anchored directly to the lateral track bed portions of said first track bed,
   moving the car superstructure (1) in a direction transverse with respect to a car longitudinal plane (7) of the first car until the car superstructure (1) is essentially not arranged above the first car frame (40),
   moving the second train with at least a second car which comprises a car frame into a loading position,
   moving the car superstructure (1) in a direction transverse with respect to a longitudinal car plane (7) of the second car until the car superstructure (1) is arranged above the car frame of the second car,
   lowering the car superstructure (1) onto the second car frame by means of the first lifting devices (101;111) or by means of second lifting devices (101, 111), wherein the second lifting devices (101;111) are anchored directly to the lateral track bed portions of said second track bed.

14. The method as claimed in claim 13, characterized in that the first and second trains are arranged one next to the other at a respective unloading or loading position, while the car superstructure (1) is transferred from the car frame (40) of the first train to the car frame of the second train.

15. The method as claimed in claim 13, characterized in that the first train is arranged next to an unloading and loading position to which the car superstructure (1) is moved from the car frame (40) of the first train, and in that the second train is arranged next to the unloading and loading position from which the car superstructure (1) is moved to the car frame of the second train.

16. The method as claimed in claim 15, characterized in that, after the first train has been unloaded, the second train is moved to the position of the first train next to the unloading and loading position, and the car superstructure (1) is moved onto the car frame of the second train.

17. A loading and unloading device for a car superstructure (1) of a rail car (1, 40) comprising the car superstructure and a car frame (40), the loading and unloading device having
   a loading/unloading face (140) which is arranged adjacent to rail tracks (43) on which the rail car (1, 40) is traveling, wherein the rail tracks (43) are supported on a track bed having an inter-rail track bed portion located between the rail track and lateral track bed portions adjacent to each rail beyond said inter-rail track bed portion,
   lifting devices (101, 111) for lifting the car superstructure (1) from the car frame (40) and lowering said car superstructure (1) onto it, and
   means for moving the car superstructure (1) transverse with respect to a direction of travel of the car (1, 40), in a position which is raised with respect to the car frame (40), with the result that the car superstructure (1) can be moved onto the loading and unloading face (140) from a position vertically above the car frame (40), wherein one end of each of the lifting devices (101, 111) acts on the car superstructure (1), and the other end of each of the lifting devices (101, 111) is anchored directly to the lateral track bed portions of the track bed of the rail tracks (43).

18. The loading and unloading device as claimed in claim 17, characterized in that the loading and unloading device has a position device for positioning the car (1, 40) in its direction of travel.

19. The loading and unloading device as claimed in claim 17, characterized in that the loading and unloading device has means for horizontally and/or vertically leveling, the car (1, 40) and/or the car superstructure (1) and/or the car frame (40) so that the car frame (40) and/or the car superstructure (1) and/or the entire car (1, 40) can be leveled in all directions including in the horizontal and/or vertical directions longitudinally and transversely with respect to the direction of travel of the car (1, 40).

20. The loading and unloading device as claimed in claim 17, characterized in that the loading and unloading device (100) has a multiplicity of lifting devices (101) which are arranged along the rail tracks (43), and adjacent to but not between the rail tracks (43).

21. The loading and unloading device as claimed in claim 17, characterized in that the lifting devices (101) are pneumatic or hydraulic or mechanical lifting devices.

22. The loading and unloading device as claimed in claim 17, characterized in that each of the lifting devices (101, 111) has a load support (102), wherein each load support (102) interacts with an underside of the car superstructure (1) in such a way that the car superstructure (1) can be lifted with its underside at the level of the loading/unloading face (140).

23. The loading and unloading device as claimed in claim 22, characterized in that each load support (102) of the lifting devices (101, 111) has roller elements (103), so that, after the lifting operation, the car superstructure (1) can be pushed in a direction transverse with respect to the direction of travel on each load support (102).

24. The loading and unloading device as claimed in claim 23, characterized in that at least a selection of the roller elements (103) of the lifting devices (101, 111) can be driven by motor.

25. The loading and unloading device as claimed in claim 23, characterized in that the roller elements (103) can be driven electrically, electromagnetically, hydraulically or pneumatically.

26. The loading and unloading device as claimed in claim 23, characterized in that the roller elements (103) can be driven directly or by actuation by the platform.

27. The loading and unloading device as claimed in claim 23, characterized in that the roller elements (103) are rollers or ball elements.

28. The loading and unloading device as claimed in claim 22, characterized in that the loading/unloading face is a platform (140) which forms a plane with each load support (102) in its raised position.

29. The loading and unloading device as claimed in claim 17, characterized in that the lifting devices (101) are arranged secured to the track bed next to the cars (1, 40) in their loading and unloading position.

30. The loading and unloading device as claimed in claim 17, characterized in that the drive energy for the loading and unloading device (100) is generated centrally by a common or single energy generating source or device.

31. The loading and unloading device as claimed in claim 17, characterized in that there are devices for securing the car (1, 40) in the longitudinal direction of the car (1, 40) during the loading and unloading operations.

\* \* \* \* \*